United States Patent
Krueger

(10) Patent No.: US 11,899,647 B2
(45) Date of Patent: Feb. 13, 2024

(54) DOCUMENTING TIMESTAMPS WITHIN A BLOCKCHAIN

(71) Applicant: Siemens Healthcare GmbH, Erlangen (DE)

(72) Inventor: Benedikt Krueger, Ebensfeld (DE)

(73) Assignee: Siemens Healthcare GmbH, Erlangen (DE)

(*) Notice: Subject to any disclaimer, the term of this patent is extended or adjusted under 35 U.S.C. 154(b) by 157 days.

(21) Appl. No.: 17/261,598

(22) PCT Filed: Jun. 6, 2019

(86) PCT No.: PCT/EP2019/064838
§ 371 (c)(1),
(2) Date: Jan. 20, 2021

(87) PCT Pub. No.: WO2020/025198
PCT Pub. Date: Feb. 6, 2020

(65) Prior Publication Data
US 2021/0263907 A1     Aug. 26, 2021

(30) Foreign Application Priority Data

Jul. 31, 2018 (EP) .................................... 18186602

(51) Int. Cl.
*G06F 16/00* (2019.01)
*G06F 16/23* (2019.01)

(52) U.S. Cl.
CPC ................................ *G06F 16/2315* (2019.01)

(58) Field of Classification Search
CPC ................................................. G06F 16/2315
See application file for complete search history.

(56) References Cited

U.S. PATENT DOCUMENTS

| 10,102,526 | B1* | 10/2018 | Madisetti | ............. G06Q 20/389 |
| 2016/0028552 | A1 | 1/2016 | Spanos et al. | |

(Continued)

FOREIGN PATENT DOCUMENTS

| WO | WO 2016015041 A1 | 1/2016 | |
| WO | WO 2017148245 A1 | 9/2017 | |
| WO | WO-2020036657 A1 * | 2/2020 | ............. G06Q 20/02 |

OTHER PUBLICATIONS

Wikipedia: "Trusted timestamping". https://en.wikipedia.org/wiki/Trusted_timestamping; 2018.

(Continued)

*Primary Examiner* — Syed H Hasan
(74) *Attorney, Agent, or Firm* — Harness, Dickey & Pierce, P.L.C.

(57) ABSTRACT

A method is for determining a further data block. An embodiment of the method includes receiving a further timestamp transaction via a first interface, including a hash of a dataset and a further verification time; receiving a distributed ledger via the first interface, including data blocks; determining via a first computation unit, a first time by querying a time server; performing via the first computation unit, a first check based on the first time and the further verification time; and determining via the first computation unit, upon first check being positive, the further data block based on the distributed ledger, the further data block including the further timestamp transaction. A block creation system is also included in another embodiment, for determining a further data block, the system including a first interface and first computation unit.

23 Claims, 6 Drawing Sheets

(56) References Cited

U.S. PATENT DOCUMENTS

2016/0212146 A1*  7/2016  Wilson .................. H04L 9/3297
2016/0342977 A1   11/2016  Lam
2016/0371509 A1* 12/2016  Unitt ................. H04M 3/42221
2017/0228731 A1*  8/2017  Sheng .................... G06Q 20/36
2017/0317833 A1* 11/2017  Smith .................. H04L 9/3239
2018/0374173 A1  12/2018  Chen et al.
2020/0076625 A1*  3/2020  Kass ................... G06F 16/1834

OTHER PUBLICATIONS

Bitcoin Wiki: "Block timestamp", https://en.bitcoin.it/wiki/Block_timestamp; 2020.

Wikipedia: "Shamir's Secret Sharing", https://en.wikipedia.org/wiki/Shamir%27s Secret Sharing; 2018.

Snow P. et al: "Factom Business Processes Secured by Immutable Audit Trails on the Blockchain"; Apr. 25, 2018 (Apr. 25, 2018), XP055537378; pp. 1-38; Retrieved from the Internet: URL:https://www.factom.com/wp-content/uploads/2018/10/FactomWhitepaperv1.2.pdf; 2018.

Extended European Search Report dated Jan. 15, 2019.

International Search Report and Written Opinion dated Sep. 27, 2019.

\* cited by examiner

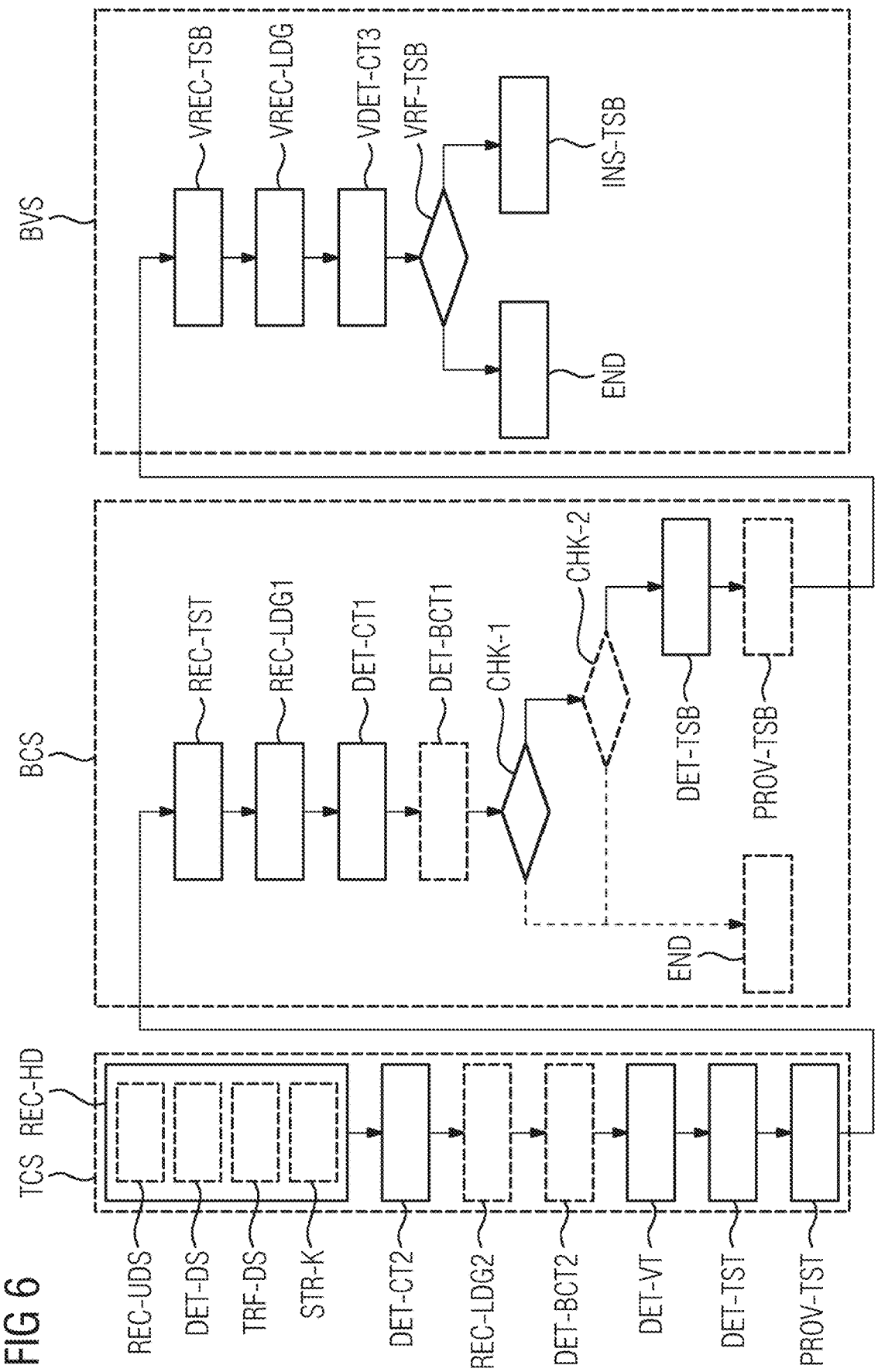

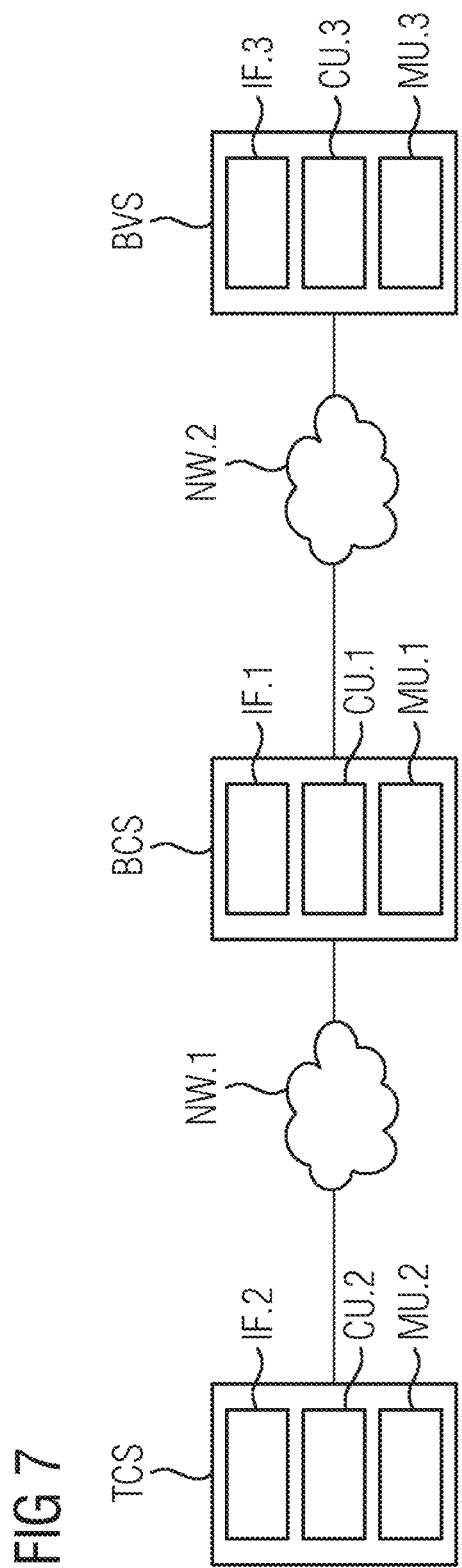

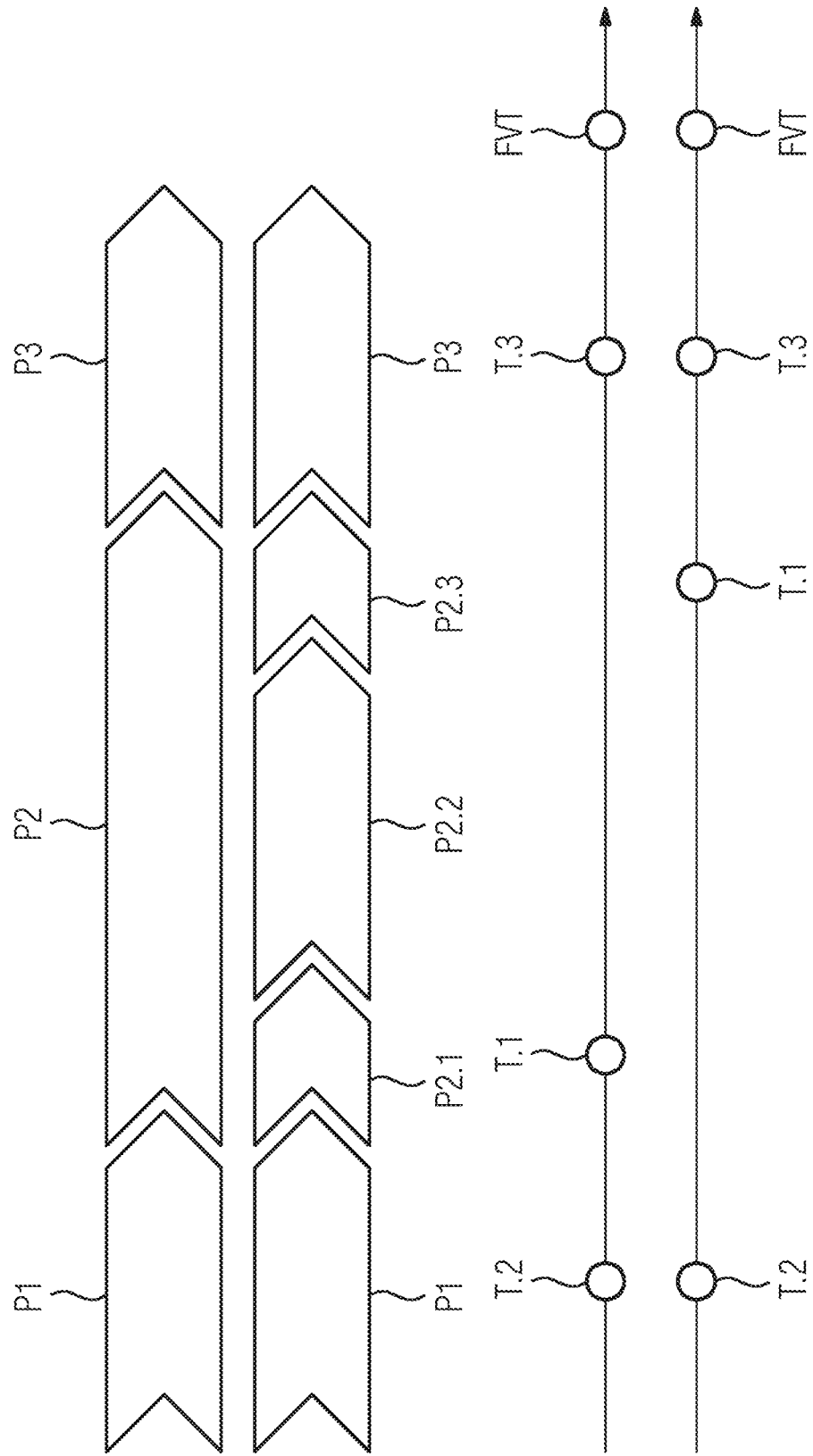

DOCUMENTING TIMESTAMPS WITHIN A BLOCKCHAIN

PRIORITY STATEMENT

This application is the national phase under 35 U.S.C. § 371 of PCT International Application No. PCT/EP2019/064838, which has an International filing date of Jun. 6, 2019, which designated the United States of America and which claims priority to European application number EP18186602.1, filed Jul. 31, 2018, the entire contents of each of which are hereby incorporated herein by reference.

FIELD

Embodiments of invention relate to a method for determining a further data block (FTSB) and a block creation system.

BACKGROUND

In many situations it is necessary to proof that a certain document or certain data was known to an entity at or before a certain point in time. For example, the time of the creation of medical data (e.g. examination results, laboratory reports, diagnosis information) can be relevant for settlement with payers, and also for proving that certain facts have been known at a certain time for handling insurance cases.

Another example is in the area of art and literature, where artists and authors being new in their business often have to approach large entities (music labels, publishers) in order to get their work promoted. The artists and authors would like to document that they had access to their own work before they approach the large entity, in order to prevent that the large entity simply steals their work and attributes it to another artist or author.

In the area of intellectual property, it is often necessary to proof the existence of certain knowledge or a technological development within a company at a certain time, in order to proof prior use if a competitor files a patent with respect to this knowledge or technological development. In particular, if certain knowledge or a technological development should be kept secret instead of filing a patent (know-how protection), in order to in order to obtain protection it is necessary to proof the existence of the certain knowledge or a technological development at a certain date.

For obtaining a timestamp it is known to send a printed version of the document or the data to be timestamped to a trusted entity (e.g. a notary), which then signs the printed version of the document or the data or a sealed envelope containing the printed version of the document or the data, at the same time noting the current time. This procedure has the disadvantage that the document or the data has to leave the company, and in case of the sealed envelope, can only be used once for proofing the timestamp. Furthermore, creating a printed version of a document or data can be almost impossible for large amounts of data (e.g. videos).

Furthermore it is known to use digital timestamping. Basically, a trusted authority creates a signature based on a hash of the document or the data and based on the current time, signing with its private key. The integrity of the timestamp can then be proven based on a signature verification algorithm using the public key of the trusted authority. This known method of digital timestamping has the disadvantage that the trusted authority can be corrupted, e.g. the trusted authority can expose its private key to the public, leading to a corruption of all issued timestamps.

SUMMARY

For documenting content in a revision-safety and tamper-proof way, it is known to insert data or hashes of data into blocks of a blockchain. These blocks can comprise timestamps, as explained for example in the internet publication https://en.bitcoin.it/wiki/Block_timestamp. The inventors have discovered that these timestamps can (in some boundaries) been manipulated by the creator of the block. Furthermore, since including transactions into a blockchain can be delayed, the inventors have discovered that there is no control which timestamp will actually be issued.

At least one embodiment of the invention provides an immutable, non-corruptable timestamp.

Embodiments of the invention are directed to a method for creating a data block, a method for providing a timestamp transaction, a method for including a data block, a block creation system, by a transaction creation system, a computer program product and a computer-readable medium. Advantageous embodiments can be found in the dependent claims.

At least one embodiment of the invention relates to a method for determining a further data block, comprising receiving a further timestamp transaction with a first interface, wherein the further timestamp transaction comprises a hash of a dataset and a further verification time. The method furthermore comprises receiving a distributed ledger with the first interface, wherein the distributed ledger comprises data blocks. Furthermore, the method comprises determining a first time by querying a time server with a first computation unit. Furthermore, the method comprises performing a first check based on the first time and the further verification time with the first computation unit, and in the case of a positive first check, determining a further data block based on the distributed ledger with the first computation unit, wherein the further data block comprises the further timestamp transaction. In particular, a data block comprises ones or more timestamp transaction, and a timestamp transaction comprises a hash of a dataset and a verification time.

At least one embodiment of the invention furthermore relates to a method for providing a further timestamp transaction, comprising receiving a hash of a dataset with a second interface. Furthermore, the method comprises determining a second time by querying a time server with a second computation unit and determining a further verification time based on the second time, wherein the further verification time is later than the second time. The method furthermore comprises determining the further timestamp transaction with the second computation unit, wherein the further timestamp transaction comprises the hash of the dataset and the further verification time, and wherein the further timestamp transaction optionally comprises the second time. Finally, the method comprises providing the timestamp transaction with the second interface.

In a further possible embodiment, the invention relates to a method for verifying a timestamp, comprising:
  receiving a timestamp with a fourth interface, the timestamp comprising a hash of a dataset and a non-verified verification time,
  receiving a distributed ledger with the fourth interface, wherein the distributed ledger comprises data blocks,
  determining a set of data blocks contained in the distributed ledger with a fourth computation unit, wherein each data block of the first set of data blocks comprises a timestamp transaction comprising the hash of the dataset,
wherein the timestamp transaction comprises a verification time being earlier than or equal to the non-verified verification time,
verifying the timestamp based on the set of data blocks with the fourth computation unit.

At least one embodiment of the invention furthermore relates to a block creation system for determining a further data block, comprising:
a first interface, configured for receiving a further timestamp transaction, wherein the timestamp transaction comprises a hash of a dataset and a further verification time,
furthermore configured for receiving a distributed ledger, wherein the distributed ledger comprises data blocks,
a first computation unit, configured for determining a first time by querying a time server, furthermore configured for performing a first check based on the first time and the further verification time, furthermore configured for, in the case of a positive first check, determining the further data block based on the distributed ledger, wherein the further data block comprises the further timestamp transaction.

At least one embodiment of the invention furthermore relates to a transaction creation system for providing a further timestamp transaction, comprising:
a second interface, configured for receiving a hash of a dataset,
furthermore configured for providing the further timestamp transaction
a second computation unit, configured for determining a second time by querying a time server, furthermore configured for determining a further verification time based on the second time, wherein the further verification time is later than the second time, furthermore configured for determining the further timestamp transaction, wherein the further timestamp transaction comprises the hash of the dataset and the further verification time, and optionally the second time.

In a further possible embodiment, the invention relates to a block verification system for including a further data block into a distributed ledger, wherein the data block was provided and/or determined by a method for determining a further data block according to the invention and its aspects, comprising:
a third interface, configured for receiving the further data block, wherein the further data block comprises a further timestamp transaction, furthermore configured for receiving the distributed ledger,
a third computation unit, configured for determining a third time by querying a time server, furthermore configured for verifying the further data block based on the third time, and optionally based on the distributed ledger,
furthermore configured for, in case of a positive verification, including the further data block into the distributed ledger.

In a further possible embodiment, the invention relates to a timestamp verification system for verifying a timestamp, comprising:
an fourth interface, configured for receiving a timestamp, the timestamp comprising a hash of a dataset and a non-verified verification time furthermore configured for receiving a distributed ledger, wherein the distributed ledger comprises data blocks,
a fourth computation unit, configured for determining a set of data blocks contained in the distributed ledger with a fourth computation unit, wherein each data block of the first set of data blocks comprises a timestamp transaction comprising the hash of the dataset, wherein the timestamp transaction comprises a verification time being earlier than or equal to the non-verified verification time, furthermore configured for verifying the timestamp based on the set of data blocks with the fourth computation unit.

In a further embodiment, the invention relates to a block system for creating and including a further data block into a distributed ledger, the block system comprising a transaction creation system, a block creation system and a block verification system, to a transaction creation system for providing a further timestamp transaction, the transaction creation system comprising:
a second interface, configured for receiving a hash of a dataset,
furthermore configured for providing the further timestamp transaction
a second computation unit, configured for determining a second time by querying a time server, furthermore configured for determining a further verification time based on the second time, wherein the further verification time is later than the second time, furthermore configured for determining the further timestamp transaction, wherein the further timestamp transaction comprises the hash of the dataset and the further verification time, and optionally the second time; the block creation system comprising:
a first interface, configured for receiving a further timestamp transaction, wherein the further timestamp transaction comprises a hash of a dataset and the further verification time, furthermore configured for receiving a distributed ledger with the first interface, wherein the distributed ledger comprises data blocks,
a first computation unit, configured for determining a first time by querying a time server, furthermore configured for performing a first check based on the first time and the further verification time, furthermore configured for, in the case of a positive first check, determining the further data block based on the distributed ledger, wherein the further data block comprises the further timestamp transaction; and the block verification system comprising:
a third interface, configured for receiving the further data block, wherein the further data block comprises a further timestamp transaction, furthermore configured for receiving the distributed ledger,
a third computation unit, configured for determining a third time by querying a time server, furthermore configured for verifying the further data block based on the third time, and optionally based on the distributed ledger, furthermore configured for, in case of a positive verification, including the further data block into the distributed ledger.

At least one embodiment of the invention furthermore relates to a computer program product comprising program elements, directly loadable into a memory unit of a block creation system and/or directly loadable into a memory unit of a transaction creation system and/or directly loadable into a memory unit of a block verification system, which induces the block creation system to carry out the steps of the method for determining a further data according to one of the embodiments, and/or which induces the transaction creation system to carry out the steps of the method for determining a further timestamp transaction according to an embodiment, and/or which induces the block verification system to execute the method for inserting a further data block into a distributed ledger according to an embodiment, when the program elements are executed by the block creation system and/or the transaction creation system and/or the block verification system.

A further possible embodiment of the invention relates to a computer program product comprising program elements, directly loadable into a memory unit of a block creation system, which induces the block creation system to carry out the steps of the method for determining a further data according to one of the embodiments, when the program elements are executed by the block creation system.

A further possible embodiment of the invention relates to a computer program product comprising program elements, directly loadable into a memory unit of a transaction creation system, which induces the transaction creation system to carry out the steps of the method for determining a further timestamp transaction according to an embodiment, when the program elements are executed by the transaction creation system.

A further possible embodiment of the invention relates to a computer program product comprising program elements, directly loadable into a memory unit of a block verification system, which induces the block verification system to execute the method for inserting a further data block into a distributed ledger according to an embodiment, when the program elements are executed by the block verification system.

A further possible embodiment of the invention relates to a computer program product comprising program elements, directly loadable into a memory unit of a timestamp verification system, which induces the timestamp verification system to execute the method for verifying a timestamp according the invention and its embodiments, when the program elements are executed by the timestamp verification system.

A further possible embodiment of the invention relates to a computer program product comprising program elements, directly loadable into a memory unit of a block system, which induces the block system to execute the method for creating and inserting a further timestamp transaction into a distributed ledger according the invention and its embodiments, when the program elements are executed by the block system.

At least one embodiment of the invention furthermore relates to a computer-readable medium on which program elements are stored that can be read and executed by a block creation system and/or a transaction creation system and/or a block verification system, in order to perform steps of the of the method for determining a further data block according to one of the embodiments, and/or in order to perform steps of the method for determining a further timestamp transaction according to an embodiment, and/or in order to perform steps of the method for inserting a further data block into a distributed ledger according to an embodiment, when the program elements are executed by the block creation system and/or the transaction creation system and/or the block verification system.

A further possible embodiment of the invention relates to a computer-readable medium on which program elements are stored that can be read and executed by a block creation system, in order to perform steps of the of the method for determining a further data block according to one of the embodiments, when the program elements are executed by the block creation system.

A further possible embodiment of the invention relates to a computer-readable medium on which program elements are stored that can be read and executed by a transaction creation system, in order to perform steps of the method for determining a further timestamp transaction according to an embodiment, when the program elements are executed by the transaction creation system.

A further possible embodiment of the invention relates to a computer-readable medium on which program elements are stored that can be read and executed by a block verification system, in order to perform steps of the method for inserting a further data block into a distributed ledger according to an embodiment, when the program elements are executed by the block verification system.

A further possible embodiment of the invention relates to a computer-readable medium on which program elements are stored that can be read and executed by a timestamp verification system, in order to perform steps of the method for verifying a timestamp according to an embodiment of the invention and its aspects, when the program elements are executed by the timestamp verification system.

A further possible embodiment of the invention relates to a computer-readable medium on which program elements are stored that can be read and executed by a block verification system, in order to perform steps of the method for creating and inserting a further timestamp transaction into a distributed ledger according an embodiment of the invention and its aspects, when the program elements are executed by the block system.

BRIEF DESCRIPTION OF THE DRAWINGS

The properties, features and advantages of this invention described above, as well as the manner they are achieved, become clearer and more understandable in the light of the following description and embodiments, which will be described in details in the context of the drawings. This following description does not limit the invention on the contained embodiments. Same components or parts can be labeled with the same reference signs in different figures. Spaces in uniform resource locators and file locations are not relevant and only for better readability. In general the figures are not for scale. In the following.

DETAILED DESCRIPTION OF THE EXAMPLE EMBODIMENTS

Figure 1:
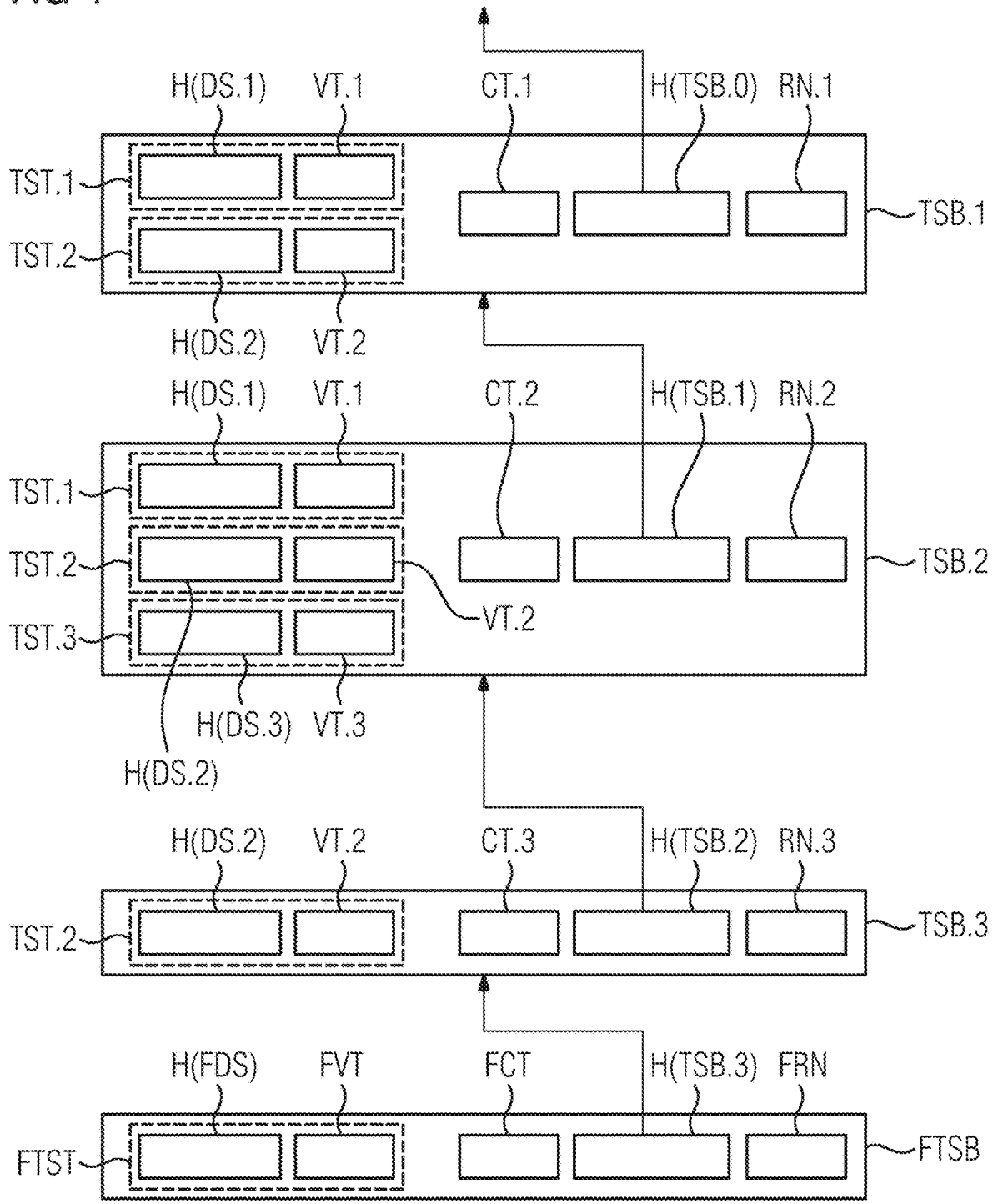
FIG. 1 displays an embodiment of the distributed ledger.

In the following, solutions according to embodiments of the invention are described with respect to systems, units and apparatuses as well as with respect to methods. Features, advantages or alternative embodiments herein can be assigned to the other corresponding objects and vice versa. In other words, the systems, units and apparatuses can be improved with features described or claimed in the context of the corresponding methods. In this case, the functional features of the method are embodied by objective units of the systems, units and apparatuses.

Furthermore, embodiments of the invention are described with in context of different methods, systems, units and apparatuses corresponding to different possible aspects of the invention. It has to be understood that advantageous embodiments and features of any object described in the context of one method, system, unit or apparatus can also be advantageous embodiments and features of the same object for other methods, systems, units and apparatuses.

Furthermore, it has to be understood that the methods and systems for using an object provided or created by another method or system can always be extended with steps and/or components of the another method or system. In other words, methods or systems for providing and/or creating an object and methods or systems for using the object can always be combined into a joint method or system of creating and using the object.

In particular, each of the disclosed and/or claimed method can be a computer-implemented method.

The adjective "further" characterizing any object can be replaced with the adjective "additional". A "further object" can comprise all advantageous features and embodiment described with respect to the "object" itself, and vice versa. For example, a "further verification time" is a "verification time", a "further timestamp transaction" is a "timestamp transaction", and a "further data block" is a "data block".

In general, at least one embodiment of the invention is directed to a method or system to define timestamp transactions comprising a hash of a dataset and a verification time, which will be documented in one or several data blocks of a distributed ledger. The verification time should be a time after the generation of the data block documenting the timestamp transaction, so that by generating the data block the generating entity acknowledges that the hash of dataset was known before the verification time. In particular, a timestamp transaction can be documented in several data blocks, so that more than one entity acknowledges the existence of the hash before the verification time. Furthermore, if inserting a data block generated by another entity, the one or several verification times of the data blocks are compared with the current time, comparable to the situation of financial transactions documented in a distributed ledger, where it is checked that the insertion of a data block does not lead to negative account balances.

At least one embodiment of the invention relates to a method for determining a further data block, comprising receiving a further timestamp transaction with a first interface, wherein the further timestamp transaction comprises a hash of a dataset and a further verification time. The method furthermore comprises receiving a distributed ledger with the first interface, wherein the distributed ledger comprises data blocks. Furthermore, the method comprises determining a first time by querying a time server with a first computation unit. Furthermore, the method comprises performing a first check based on the first time and the further verification time with the first computation unit, and in the case of a positive first check, determining a further data block based on the distributed ledger with the first computation unit, wherein the further data block comprises the further timestamp transaction. In particular, a data block comprises ones or more timestamp transaction, and a timestamp transaction comprises a hash of a dataset and a verification time.

In particular, the first interface is an interface of a block creation system. In particular, the first computation unit is a computation unit of the block creation system.

In general, a timestamp comprises data and an assigned time information. In particular, a timestamps is related to the fact that the data it comprises was created or modified at or before the assigned time information. Here, the data of the timestamp is the hash of the dataset, and the assigned time information is the further verification time.

The inventor recognized that by creating a data block comprising a timestamp transaction, the block creation system verifies the timestamp transaction as being correct, in particular that the further verification time is later than the time of the issuance of the data block. So the further verification time can be considered as the time of the timestamp. In particular, the block creation system is different from the system creating the timestamp transaction, so the block creation system can be considered as independent entity verifying the timestamp.

By including only the hash of the dataset into the timestamp or the timestamp transaction, on the one hand the data size that needs to be stored within the data block is smaller, on the other hand the dataset itself does not need to be exposed to the block creation system or any other entity. At the same time, the hash of the dataset can only be reconstructed based on the dataset itself, and not based on any other dataset, so a timestamp comprising the hash of a dataset can be used as a timestamp comprising the actual dataset.

By performing the first check based on the further verification time and the first time, the plausibility of the further verification time can be ensured, so that a manipulation of the timestamp is harder to achieve.

In general, a distributed ledger is a certain type of a decentralized database. In particular, the distributed ledger is distributed in the sense that there are several copies of (at least parts of) the distributed ledger in different memory units, wherein the memory units are spatially distributed. The distributed ledger comprises multiple records, wherein the multiple records can be identified with database entries. In particular, the multiple records are organized as data blocks or as data blocks. In particular, the records are created by different entities, in particular different nodes of a network, and stored with the different entities, in particular within the different nodes of the network. In other words, the construction and maintenance of the records is typically not performed by a central authority, but independently by nodes of the network. In typical cases, all nodes of the network maintain one copy of the distributed ledger.

In general, updating the distributed ledger is typically based on a consensus mechanism, wherein a consensus mechanism ensures that the different copies of the distributed ledger match, also in the cases of a delayed communication between the entities storing the copies of the distributed ledger.

In particular, instead of the term "data block" the term "timestamp data block" can be used. In general, data blocks are the elementary data records of the distributed ledger. In particular, a data block is an immutable data structure, which means that a data block cannot be changed or modified. This implies that changes to the ledger can only be performed by adding or removing data blocks. In particular, the immutability of a data block can be ensured by storing a hash value of the data block within the data block or outside the data block.

In particular, a data block can comprise an arbitrary number of timestamp transactions. In particular, a data block can comprise a fixed number of timestamp transactions, in particular, the fixed number can be one.

By using a distributed ledger comprising data blocks different copies of the distributed ledger can be synchronized more efficiently. In particular, using immutable data blocks it can be made harder for someone to manipulate the distributed ledger.

In particular, a hash of a dataset is the result of the application of a hash function on the dataset or a combination of the dataset and other data. In particular, the hash function can take other arguments, for example a seed.

In general a hash function is a function that maps data of arbitrary size to data of a fixed size. In particular, the hash function is a cryptographic hash function. In particular, a cryptographic hash function is a deterministic function; in particular the output of the hash function does only depend on the input of the hash function. In particular, a cryptographic hash function can be calculated in a fast manner for all input values. In particular, a cryptographic hash function is only brute-force invertible, i.e. given the output of a cryptographic hash function it is only possible to calculate the corresponding input of the cryptographic hash function by calculating the cryptographic hash function for an large amount of input values (i.e. a brute-force attack). In other words, finding the input value corresponding to the output value of a cryptographic hash function is an intractable problem. In particular, finding a first input value and a second input value of a cryptographic hash function that lead to an identical output value is an intractable problem. In particular, a cryptographic hash function is scattering; i.e. even correlated inputs of the cryptographic hash function lead to uncorrelated outputs of the cryptographic hash function.

In particular, a hash function can calculate a Merkle root of the input data, in particular by computing hashes within a Merkle tree.

In particular, a time server is a server that reads the actual time from a reference clock and distributes this information to its clients using a computer network. The time server may be a local network time server or an internet time server. In particular, the time information can be distributed by the "Network Time Protocoll" (an acronym is "NTP") or the "Precission Time Protocoll" (an acronym is "PTP").

The time reference used by a time server could be another time server on the network or the Internet, a connected radio clock or an atomic clock. The most common true time source is a GPS (acronym for "Global Positioning System") or GPS master clock.

A time server can be implemented as dedicated hardware server, as dedicated virtualized server, or as software on a general server.

In particular, the first time is the current time of the time server at the time of querying the time server. The querying of the time server can be executed before determining the further data block, or alternatively after determining the further data block. In particular, the first time can be defined with respect to a timezone, e.g. with respect to GMT (acronym for "Greenwich Mean Time").

In particular, the first time can be determined by querying the time server by the first computation unit interchanging data with the time server. In particular, the first computation unit can send a query message to the time server, and the time server can send a response message to the first computation unit.

In general, a verification time corresponds to the time at which the hash of the dataset was known to the owner and/or creator of the dataset. In particular, the verification time is not the actual time the hash was created and/or known to the owner and/or creator of the dataset, but the time of knowledge that should be verified. So on general the verification time is later than the actual time the hash was created and/or known to the owner and/or creator of the dataset. In particular, for a timestamp transaction comprising the verification time to be included into a data block, and/or for a data block comprising a timestamp transaction to be included into the distributed ledger, wherein the timestamp transaction comprising the verification time, the verification time should be later than the current time. In general, a "further verification time" is a "verification time".

According to a further embodiment of the invention the first check is positive if the further verification time is later than the first time.

The inventor recognized that by a check whether the further verification time is later than the first time it can be ensured that the timestamp is accurate in the sense that it proofs the knowledge of the hash of the dataset or the dataset itself actually at or before the further verification time.

According to a further embodiment of the invention the method for creating a data block comprises determining an average block creation time based on the distributed ledger with the first computation unit. Herein the first check is furthermore based on the average block creation time.

In particular, the average block creation time is the average time needed for all block creation systems contributing to the distributed ledger to create a further data block. In particular, the average block creation time can be determined based on block time information contained in the data blocks of the distributed ledger. In particular, the average block creation time can be calculated as the average of the time difference between the block times of a certain number of the latest blocks.

In particular, the first check can be based on the average block creation time by the first check being a comparison involving the further verification time, the first time and the average block creation time. In particular, the first check can be based on the average block creation time by the first check being a comparison of the further verification time and a function of the first time and the average block creation time. In particular, the function is monotonically increasing in terms of the average block creation time. In particular, the function is the sum of the first time and a product of the average block creation time with a positive constant.

The inventor recognized that by the first check being based on the average block creation time, before initiating the actual creation of the block it can be verified that there is an actual chance for creating According to a further possible embodiment of the invention, the method for determining a further data block comprises performing a second check based on the distributed ledger and the further timestamp transaction with the first computation unit, wherein the determining of the further data block is only executed in the case of a positive second check.

In particular, the second check can be based on the number of data blocks within the distributed ledger comprising a timestamp transaction, wherein the hash contained in the timestamp transaction equals the hash contained in the further timestamp transaction. In other words, the second check can be based on the number of times the further timestamp transaction is already contained in a timestamp block of the distributed ledger. In particular, the second check can comprise comparing this number with a given threshold. In particular, the threshold can be the number of data blocks necessary to verify a certain timestamp transaction.

According to a further embodiment of the invention, the second check is positive if the number of data blocks in the distributed ledger related to the further timestamp transaction is below a given threshold number. In particular, a data block is related to the further timestamp transaction if the data block comprises a timestamp transaction which comprises the same hash as the further timestamp transaction.

The inventor recognized that by performing the second check before actually determining the further data block, it can be checked whether the further timestamp transaction is actually contained in a number of data blocks of the distributed ledger with is big enough. This allows a more efficient determination of further data blocks, because no effort is wasted for determining data blocks containing already verified timestamps.

According to a further possible embodiment of the invention, the further timestamp transaction and/or the further data block comprise an identifier of the time server. In particular, the identifier of the time server is a uniform resource locator and/or an IP address identifying the time server. In particular, the time server is the time server being queried for determining the second time.

The inventor recognized that based on the identifier of the time server contained in the further timestamp transaction and/or the further data block the reliability and/or the quality of acknowledgement of the further verification time by creating the further data block can improved, because different time servers can provide a different quality of times.

According to a further embodiment of the invention each of the data blocks is linked to at least one preceding data block of the distributed ledger; and/or wherein the distributed ledger is a blockchain, a blocktree and/or a tangle; and/or wherein determining the further data block comprises executing a proof-of-work, a proof-of stake or a proof-of-elapsed-time consensus mechanism.

The inventor recognized that by these properties the revision-safety of the distributed ledger can be increased, and that the distributed ledger can be harder to manipulate by an malicious participant of the network.

In particular, by data blocks of the distributed ledger being linked to previous data blocks, the distributed ledger can be interpreted as a mathematical graph, wherein the data blocks can be interpreted as the nodes of the graph, and wherein there is an directed edge from a first node to a second node if the first data block corresponding to the first node is linked to a previous second data block corresponding to the second node.

In particular, the first ledger is a tangle if the first ledger is a directed acyclic graph. In particular, the first ledger is a blocktree, if for each data block in the first ledger (except a single origin data block) there is exactly one parent of the data block. In particular, the first ledger is a blockchain if for each data block in the first ledger (except a single origin data block) there is exactly one successor of the data block in the first ledger; and for each data block in the first ledger (except one block data block) there is exactly one parent of the data block in the first ledger.

In general, a proof of work is a measure required by an entity to perform an action in a system, in particular by a computer to perform an action within a network, to reduce the possible number of actions in a certain time interval. In general, proof of work can also be interpreted as an economic measure to deter denial of service attacks and other service abuses such as spam on a network by requiring some work from a system using a service. In general the action to be performed is an asymmetric action, meaning that the resources needed for performing the action are higher than resources needed for verifying that the action actually has been performed. In particular, a proof of work can be a challenge-response proof of work or a solution-verification proof of work.

In particular, a proof of work is a CPU-bound proof of work, a memory-bound proof of work or a network-bound proof of work. In particular, for a CPU-bound proof of work more calculation steps have to be executed by a calculation unit, in particular a processor, in particular a central processing unit (an acronym is "CPU"), to perform the action than to verify that the action actually has been performed. In particular, for a memory-bound proof of work the size of the memory, in particular the size of a random access memory (an acronym is "RAM") or of the hard disk (an acronym is "HD"), needed for performing the action is higher than the size of the memory needed for verifying that the action actually has been performed. In particular, for a network-bound proof of work more communication actions or communications actions with a higher latency have to be performed for performing the action than for verifying that the action actually has been performed.

In particular, the action to be performed for a proof of work, in particular for a CPU bound proof of work, is calculating the inverse of a one-way function, in particularly by calculating the one-way function multiple times and checking whether the result of the one-way function has a desired property or equals a desired value. In general, a one-way function is a function that can computed by a polynomial time algorithm, but any polynomial time randomized algorithm that attempts to compute a pseudo-inverse for the one-time functions succeeds with negligible probability. Examples for one-way functions is the multiplication of prime numbers (the inverse is the factorization of integer numbers), the Rabin function, the discrete exponential (calculating an exponential modulo an integer, in particular a prime number, the inverse function is the discrete logarithm), cryptographic hash functions, integer multiplication of points on elliptic curves over finite fields, or one-way functions based random linear codes or based on the subset sum problem.

In particular, the action to be performed for a memory-bound proof of work includes the computation of a memory bound function. In particular, the action to be performed for a memory bound proof of work can comprise finding a subgraph or a cycle of a given length in a given random graph or random structure. In particular, the graph can be given by giving an initial seed being the input to a function, in particular a hash function, in order to efficiently define the graph, without storing or communicating the whole graph.

In particular, a network-bound proof of work can comprise communication with several network nodes, wherein the access of one or more network nodes is delayed by network latency or by the accessed networks. In particular, a network-bound proof of work can comprise downloading certain data stored on different network nodes.

In particular, a proof of work can be based on one of the following methods, problems or functions: calculating integer square root modulo a large prime, Weaken Fiat-Shamir signatures, Ong-Schnorr-Shamir signatures, partial hash inversion, hash sequences, Diffie-Hellman-based puzzles, moderate, mbound, Hokkaido, Cuckoo Cycle, Merkle tree based and/or guided tour puzzle protocol.

In general, proof of stake means that only one node or a small amount of nodes from a plurality of nodes can determine a link information or create a block that is accepted as valid from other nodes of the network. The selection of the one node or the small amount of nodes can depend on a random selection, an amount of digital items assigned to the nodes (in other words, an account balance assigned to or associated with a node), or an age of digital items assigned to the nodes. In particular, a digital item can be a token or a unit of a cryptocurrency, and an account can comprise several such tokens or units. Another word for the amount of such tokens or cryptocurrency units is size of stake.

Furthermore, there can also be other protocols for selection the node or the small number of nodes, for example by defining certain master nodes, or by introducing checkpoints.

In particular, the one node or the small amount of nodes can be selected in a random way based on the hash value of the size of stake, e.g. by only accepting a further data block from the one node with the smallest the hash value, or by only accepting a further data block from the small amount of nodes with the n smallest the hash values, wherein n is an integer number. Alternatively, a proof of stake can also be based on the size of stake and/or on the time a certain token or cryptocurrency unit was assigned to or associated with a node. In particular, the proof of stake can be based on the "Slasher" protocol or the "Casper" protocol.

In general the ownership of a token or a cryptocurrency unit can be proven by having access to a private key of an asymmetrical encryption key pair comprising the private key and a public key. To proof the possession of the private key without publishing the private key, the private key can be used for generating signatures, which then can be published. In particular, a token or a cryptocurrency unit is assigned to or associated with a block creation unit if the block creation unit stores the private key.

The usage of a proof of stake consensus has the advantage there the costs for the hardware executing the proof of stake can be reduced significantly with respect to a proof of work consensus, which allows to have a hardware being distributed broadly, an thus increasing the robustness against attacks based on hardware distribution. Furthermore, for the use of a proof of stake consensus the total power consumption of the hardware executing the proof of stake consensus is significantly reduced compared to a proof of work consensus. Furthermore, but depending on the actual implementation of the proof of stake protocol, the time intervals between including further blocks into the distributed ledger can be reduced compared to a proof of work protocol.

In general, a proof of elapsed time means that the creation of a new data block by a node is based on elapsed time in the node or in the calculation unit. In particular, a proof of elapsed time may be based on secure instruction execution. In particular, the secure instruction execution can be done my using a secure environment and utilizing trustworthy functions, in particular a secure hardware environment. Another name for the secure environment is "trusted execution environment"; an example for a trusted executed environment is the product feature "Software Guard Extensions". In particular, a trusted execution environment comprises central processing unit (an acronym is "CPU") instruction codes that allows user-level code to allocate private regions of memory (sometimes called enclaves) that are protected from processes running at higher privilege levels. In particular, the proof of elapsed time can be based on a timer or time counting function executed in such an enclave, so that it is not possible for any other process to manipulate the timer. In particular, the probability for creating a new block or determining the further link information can be proportional to the elapsed time.

According to a further possible embodiment of the invention a first data block of the distributed ledger comprises a link information related to a second data block of the distributed ledger. In particular, the first data block and the second data block can be identical. In particular, each of the data blocks of the distributed ledger comprises a link to another data block of the distributed ledger.

In particular, a first data block of the distributed ledger and a second data block of the distributed ledger can be linked. This link can be an undirected or a directed link. In particular, a link of the first data block and the second data block is present, if the first data block comprises a link information related to the second data block and/or if the second data block comprises a link information related to the first data block. In particular, a link information can be a data integrity information. In particular, by inspecting the data integrity information related to the first data block a manipulation and/or altering of the first data block can be recognized or determined.

A common example for a link information related to a first data block is a hash of (at least parts) of the first data block, in particular, the hash of (at least parts) of the first data block may be stored in the second data block. Storing the hash of the first data block in the second data block allows verifying that the at least one of the data blocks was not altered after the determining of the hash, if it can be assumed that the hash contained in the second data block was not altered.

It is also possible that the data blocks of the distributed ledger comprise several link informations, in particular each of the further link informations can be a hash of another data block of the respective distributed ledger. It is possible that a link information contained in a data block of the distributed ledger is related to the data block, in particular, it is possible that the link information in a data block is identical with the hash of (at least parts) of the data block.

The inventor has recognized that by using link information in the data blocks the structure of the distributed ledger can be incorporated into the data blocks, so that the structure of the distributed ledger need not to be stored in an external and/or separate data item.

According to a further possible embodiment of the invention a link information related to a second data block comprises a hash of the second data block.

In general a hash of a data block is the result of a hash function being applied to the data block, the result of a hash function being applied to a subset of information contained in the data block, or the result of a hash function being applied to a combination of a first subset of information contained in the data block and a second subset of information, wherein the second subset of information is a subset of information of the data block that contains or will contain the hash.

The inventor recognized that using a hash of a second data block as link information comprised by a first data block makes the second data block immutable, or at least changes or manipulations of the second data block can be determined by inspecting the first data block, in particular by comparing a hash calculated based on the second data block with the hash of the second data block stored in the first data block.

According to a further possible embodiment of the invention, the distributed ledger is only accessible from within a trusted network. The inventor recognized that allowing access only from within a trusted network improves the data protection. Furthermore fraudulent manipulations of first ledger are made more difficult, because a manipulating entity must have access to the trusted network.

In general, a trusted network comprises entities or network nodes that authorized by a central authority to access the distributed ledger and/or to include further data blocks into the distributed ledger. All other entities or network nodes not contained in the trusted network are not authorized by the central authority to access the distributed ledger and/or to include further data blocks into the distributed ledger. A common name for a distributed ledger accessible only from within a trusted network is "consortium ledger". In the case the distributed ledger is a blockchain, a common name for the distributed ledger accessible only from within a trusted network is "consortium blockchain". Other known terms are "permissionless ledger" or "permissionless blockchain", which are used as opposites to the terms "permissioned ledger" or "permissioned blockchain".

At least one embodiment of the invention furthermore relates to a method for providing a further timestamp transaction, comprising receiving a hash of a dataset with a second interface. Furthermore, the method comprises determining a second time by querying a time server with a second computation unit and determining a further verification time based on the second time, wherein the further verification time is later than the second time. The method furthermore comprises determining the further timestamp transaction with the second computation unit, wherein the further timestamp transaction comprises the hash of the dataset and the further verification time, and wherein the further timestamp transaction optionally comprises the second time. Finally, the method comprises providing the timestamp transaction with the second interface.

In particular, the second interface is an interface of a transaction creation system. In particular, the second computation unit is a computation unit of the transaction creation system. In particular, the transaction creation system can furthermore comprise a memory unit.

In particular, the second time is the current time of the time server at the time of querying the time server. In particular, the second time can be defined with respect to a timezone, e.g. with respect to GMT (acronym for "Greenwich Mean Time"). In general, the first time is earlier than the second time. In particular, the second time can be determined by querying the time server by the second computation unit interchanging data with the time server. In particular, the second computation unit can send a query message to the time server, and the time server can send a response message to the second computation unit.

In particular, the further verification time can be determined based on the second time by choosing the further verification time being later than the second time. Furthermore, the further verification time can be determined based on the second time by the further verification time being calculated as a function of the second time.

It is not essential for the embodiment of the invention that the further verification time is determined based on the second time. Alternatively, the further verification time can be received by the interface, and the further verification time can furthermore be verified based on the second time. In particular, the verification can then comprise checking that the further timestamp transaction can be verified in the distributed ledger before the passage of the further verification time.

The inventor recognized that by choosing the further verification time based on the current time only timestamp transactions with a certain probability of being verified are created. This means that the timestamp transactions can be determined efficiently. Furthermore, by determining the second time based on a time server it can be ensured that the second time exactly matches the actual time.

According to a further embodiment of the invention, the method for providing a further timestamp transaction comprises receiving a distributed ledger with the second interface, wherein the distributed ledger comprises data blocks, and determining an average block creation time based on the distributed ledger with the second computation unit, wherein the further verification time is furthermore based on the average block creation time.

In particular, the average block creation time is the average time needed for all block creation systems contributing to the distributed ledger to create a further data block. In particular, the average block creation time can be determined based on block time information contained in the data blocks of the distributed ledger. In particular, the average block creation time can be calculated as the average of the time difference between the block times of a certain number of the latest blocks.

In particular, the further verification time can be based on the average block creation time by the further verification time being chosen as a function of the average block creation time. In particular, the further verification time can be chosen as a sum of the second time and a function of the average block creation time. In particular, the further verification time can be chosen as a sum of the second time and a product, the product comprising as factors a real number, an integer block number, and the average block creation time, wherein the integer block number corresponds to the number of data blocks a timestamp transaction needs to be contained in in order to be considered as verified, and wherein the real number can be set by a user or determined by heuristics, in particular based on a statistical distribution of block creation times.

The inventor recognized that by the further verification time being based on the average block creation time, the further verification time can be chosen late enough that enough data blocks can be created to verify the further timestamp transaction, but on the other hand side the further verification time can be chosen early enough so that not an unnecessary long time passes between the determination of the last verifying data block and the actual further verification time. In other words, by choosing the further verification time in the proposed way an optimal further verification time can be used.

According to a further embodiment of the invention, within the method for providing a further timestamp transaction, the step of receiving the hash of the dataset comprises receiving an unencrypted dataset with the second interface, determining the dataset by symmetrically encrypting the unencrypted dataset based on a key with the second computation unit, transferring the dataset to an external storage service with the second computation unit, storing the key of the symmetric encryption within a second memory unit, and determining the hash of the dataset with the second computation unit.

The inventor recognized that by the dataset being an encrypted dataset, and only storing the encryption key privately, the amount of data to be stored securely and privately is dramatically reduced (typical key sizes are in the order of one kilobyte, wherein typical sizes of datasets are in the order of several megabytes or gigabytes).

According to a further embodiment of the invention, within the method for providing a further timestamp transaction the key comprises a first set of partial keys, wherein the unencrypted dataset can be determined based on the dataset and a second set of partial keys, wherein the second set of partial keys is a subset of the first set of partial keys. Another term for determining the unencrypted dataset is decrypting the (encrypted) dataset.

In particular, the key and/or the first set of partial keys can be chosen that any second set of partial keys can be used for decrypting the data, if the number of different partial keys within the second set of the partial keys is bigger than a threshold. Such partial keys can be obtained for example by Shamir's Secret Sharing. In particular, each partial key of the first set of partial keys can be distributed to a different person, in particular to a different person within a company.

The inventor recognized that by such keys it can be assured that no single person alone can decode the publically available encrypted dataset and access the contained information (allowing him to distribute the dataset). At the same time it can be assured that even in the case of losses of single partial keys (e.g. due to technical failures or to persons intendedly deleting partial keys) there is still the ability to decrypt the dataset in order to proof or verify the timestamp.

According to a further possible embodiment of the invention, the further timestamp transaction documents a cryptocurrency transaction fee. In particular, the cryptocurrency transaction fee regulates the transfer of an amount of cryptocurrency from an account of the creator of the further timestamp transaction to an account of the creator of the further data block. In particular, the transfer of cryptocurrency can be implemented by means of a smart contract. In particular, the amount of cryptocurrency can be based on the number of data blocks already comprising the further timestamp transaction, in particular, the transaction fee can be zero if the number of data blocks already comprising the further timestamp transaction is larger than a predefined number.

In particular, the transfer of the amount of cryptocurrency can be documented in the distributed ledger, alternatively, the transfer of the amount of cryptocurrency can be documented in another distributed ledger.

In general a cryptocurrency is a digital asset or a digital medium which can be exchanged between different entities, wherein methods of cryptography are used for transferring cryptocurrencies from a first entity to a second entity, for the creation of a new amount of cryptocurrency and/or for verifying transfers of cryptocurrency from a first entity to a second entity. In particular, a cryptocurrency is a digital currency. Cryptocurrency can be stored in accounts (another term is "wallet"), in particular, an account corresponds to a asymmetric key pair comprising a private key and a public key, wherein the private key must be known to transfer cryptocurrency from the account to another account, and wherein the public key must be known to transfer cryptocurrency from another account to the account.

In general, transferring a certain amount of cryptocurrency from a first account to a second account comprises creating a transaction log, wherein the first account corresponds to a asymmetric key pair comprising a first private key and a first public key, and wherein the second account corresponds to an asymmetric key pair comprising a second private key and a second public key, and wherein the transaction log comprises the second public key and at least one key of the first private key and the first public key, and wherein the transaction log furthermore comprises the amount of cryptocurrency being transferred. In particular, a transaction log can also comprise a signature based on the amount of cryptocurrency being transferred and the second public key, signed with the first private key.

In particular, transferring a certain amount of cryptocurrency is executed by including the transaction log into a data block of a distributed ledger. In particular, for trusting such a transfer of a certain amount of cryptocurrency, there must be multiple other data blocks being successor of the data block comprising the transaction log.

The inventor recognized that by documenting a cryptocurrency transaction fee within the timestamp transaction there can be an incentive for the entity creating data blocks. Furthermore, by transaction fees a load balancing for the block creation system is possible, by preferentially including timestamp transaction with a high transaction fee.

According to another embodiment, the invention relates to a method for including a data block provided by a method according to one of the embodiments into a distributed ledger, the method comprising receiving the further data block with a third interface, wherein the further data block comprises a further timestamp transaction, and receiving the distributed ledger with the third interface. The method furthermore comprises determining a third time by querying a time server with a third computation unit and verifying the further data block based on the third time, and optionally based on the distributed ledger, with the third computation unit. The method furthermore comprises, in case of a positive verification, including the further data block into the distributed ledger with the third computation unit.

In particular, the third interface is the interface of a block verification system. In particular, the third computation unit is a computation unit of the block verification system. Furthermore, the block verification system can comprise a third memory unit, in particular, the distributed ledger can be stored in this third memory unit.

In particular, the third time is the current time of the time server at the time of querying the time server. In particular, the third time can be defined with respect to a timezone, e.g. with respect to GMT (acronym for "Greenwich Mean Time"). In particular, the third time can be determined by querying the time server by the third computation unit interchanging data with the time server. In particular, the third computation unit can send a query message to the time server, and the time server can send a response message to the third computation unit.

The inventor recognized that by verifying the further block to be inserted, in particular the further verification time of the further data block to be inserted, it can be ensured that only data blocks with valid verification time (timestamps) are included into the distributed ledger.

In a further possible embodiment, the invention relates to a method for verifying a timestamp, comprising:
  receiving a timestamp with a fourth interface, the timestamp comprising a hash of a dataset and a non-verified verification time
  receiving a distributed ledger with the fourth interface, wherein the distributed ledger comprises data blocks,
  determining a set of data blocks contained in the distributed ledger with a fourth computation unit, wherein each data block of the first set of data blocks comprises a timestamp transaction comprising the hash of the dataset, wherein the timestamp transaction comprises a verification time being earlier than or equal to the non-verified verification time, verifying the timestamp based on the set of data blocks with the fourth computation unit.

In particular, the fourth interface is an interface of a timestamp verification system. In particular, the fourth computation unit is a computation unit of a timestamp verification system.

In particular, for determining the set of data blocks all data blocks of the distributed ledger can be checked iteratively, wherein for each data block it is checked whether it comprises a timestamp transaction comprising the hash of the dataset and comprising a verification time earlier than or equal to the non-verified verification time.

In particular, the timestamp can be verified providing a validity information, in particular a Boolean variable, characterizing the validity of the timestamp. In particular, the timestamp can be considered as verified if the cardinality of the second set (which is equivalent to the number of data blocks in the second set) is equal or larger to a predefined threshold number.

In particular, if the data blocks of the distributed ledger and/or the timestamp transactions of the data blocks of the distributed ledger comprise an identifier of a time server, verifying the timestamp can be furthermore based on the one or more identifiers of the time server within the set of data blocks. In particular, it can be checked whether the one or more identifiers correspond to trusted time servers, and/or whether the one or more identifiers correspond to a minimal number of time servers.

The inventor recognized that by verifying a timestamp based on a distributed ledger comprising data blocks, the timestamp can be checked without interacting with a central authority. Furthermore, since the distributed ledger cannot be manipulated, the timestamp can be verified very securely. By verifying the timestamp based on identifiers of time servers, the use of malicious time servers can be hampered or made impossible, increasing the security of the verification process.

In a further possible embodiment, the invention related to a method for creating and including a further data block into a distributed ledger, comprising receiving a hash of a dataset with a second interface. Furthermore, the method comprises determining a second time by querying a time server with a second computation unit and determining a further verification time based on the second time, wherein the further verification time is later than the second time. The method furthermore comprises determining the further timestamp transaction with the second computation unit, wherein the further timestamp transaction comprises the hash of the dataset and the further verification time, and wherein the further timestamp transaction optionally comprises the second time. Finally, the method comprises providing the timestamp transaction with the second interface.

The method for creating and including a further data block into a distributed ledger furthermore comprises receiving a further timestamp transaction with a first interface, wherein the further timestamp transaction comprises a hash of a dataset and the further verification time. The method furthermore comprises receiving a distributed ledger with the first interface, wherein the distributed ledger comprises data blocks. Furthermore, the method comprises determining a first time by querying a time server with a first computation unit. Furthermore, the method comprises performing a first check based on the first time and the further verification time with the first computation unit, and in the case of a positive first check, determining a further data block based on the distributed ledger with the first computation unit, wherein the further data block comprises the further timestamp transaction. In particular, a data block comprises ones or more timestamp transaction, and a timestamp transaction comprises a hash of a dataset and a verification time. The method furthermore comprises providing the further data block with the first interface.

The method for creating and including a further data block into a distributed ledger furthermore comprises receiving the further data block with a third interface, wherein the further data block comprises a further timestamp transaction, and receiving the distributed ledger with the third interface. The method furthermore comprises determining a third time by querying a time server with a third computation unit and verifying the further data block based on the third time, and optionally based on the distributed ledger, with the third computation unit. The method furthermore comprises, in case of a positive verification, including the further data block into the distributed ledger with the third computation unit.

In particular, the steps of the method for creating and including a further data block into a distributed ledger can comprise all advantageous features and embodiments of the method for determining a further data block, the method of determining a further timestamp transaction, and the method for verifying a further data block.

At least one embodiment of the invention furthermore relates to a block creation system for determining a further data block, comprising:

a first interface, configured for receiving a further timestamp transaction, wherein the timestamp transaction comprises a hash of a dataset and a further verification time, furthermore configured for receiving a distributed ledger, wherein the distributed ledger comprises data blocks, a first computation unit, configured for determining a first time by querying a time server, furthermore configured for performing a first check based on the first time and the further verification time, furthermore configured for, in the case of a positive first check, determining the further data block based on the distributed ledger, wherein the further data block comprises the further timestamp transaction.

In particular, the block creation system for determining a further data block can be configured to execute the method for determining further data block according to the invention and its aspects. The block creation system is configured to execute the method and its aspects by its first interface and its first computation unit being configured to execute the respective method steps.

The block creation system can be realized as a data processing system or as a part of a data processing system. Such a data processing system can, for example, comprise a cloud-computing system, a computer network, a computer, a tablet computer, a smartphone or the like. The block creation system can comprise hardware and/or software. The hardware can be, for example, a processor system, a memory system and combinations thereof. The hardware can be configurable by the software and/or be operable by the software.

The block creation system can be realized as a server or as part of a server; alternatively, the block creation system can be realized as a client or as part of a client; alternatively, the block creation system can be realized as combination of a server and a client.

At least one embodiment of the invention furthermore relates to a transaction creation system for providing a further timestamp transaction, comprising:
- a second interface, configured for receiving a hash of a dataset,
furthermore configured for providing the further timestamp transaction
- a second computation unit, configured for determining a second time by querying a time server, furthermore configured for determining a further verification time based on the second time, wherein the further verification time is later than the second time, furthermore configured for determining the further timestamp transaction, wherein the further timestamp transaction comprises the hash of the dataset and the further verification time, and optionally the second time.

In particular, the transaction creation system for determining a further timestamp transaction can be configured to execute the method for providing a further timestamp transaction according to the invention and its aspects. The transaction creation system is configured to execute the method and its aspects by its second interface and its second computation unit being configured to execute the respective method steps.

The transaction creation system can be realized as a data processing system or as a part of a data processing system. Such a data processing system can, for example, comprise a cloud-computing system, a computer network, a computer, a tablet computer, a smartphone or the like. The transaction creation system can comprise hardware and/or software. The hardware can be, for example, a processor system, a memory system and combinations thereof. The hardware can be configurable by the software and/or be operable by the software.

The transaction creation system can be realized as a server or as part of a server; alternatively, the transaction creation system can be realized as a client or as part of a client; alternatively, the transaction creation system can be realized as combination of a server and a client.

In a further possible embodiment, the invention relates to a block verification system for including a further data block into a distributed ledger, wherein the data block was provided and/or determined by a method for determining a further data block according to the invention and its aspects, comprising:
- a third interface, configured for receiving the further data block, wherein the further data block comprises a further timestamp transaction, furthermore configured for receiving the distributed ledger,
- a third computation unit, configured for determining a third time by querying a time server, furthermore configured for verifying the further data block based on the third time, and optionally based on the distributed ledger,
furthermore configured for, in case of a positive verification, including the further data block into the distributed ledger.

In particular, the block verification system for including a further data block into a distributed ledger can be configured to execute the method system for including a further data block into a distributed ledger according to the invention and its aspects. The block verification system is configured to execute the method and its aspects by its third interface and its third computation unit being configured to execute the respective method steps.

The block verification system can be realized as a data processing system or as a part of a data processing system. Such a data processing system can, for example, comprise a cloud-computing system, a computer network, a computer, a tablet computer, a smartphone or the like. The block verification system can comprise hardware and/or software. The hardware can be, for example, a processor system, a memory system and combinations thereof. The hardware can be configurable by the software and/or be operable by the software.

The block verification system can be realized as a server or as part of a server; alternatively, the block verification system can be realized as a client or as part of a client; alternatively, the block verification system can be realized as combination of a server and a client.

In a further possible embodiment, the invention relates to a timestamp verification system for verifying a timestamp, comprising:
- an fourth interface, configured for receiving a timestamp, the timestamp comprising a hash of a dataset and a non-verified verification time furthermore configured for receiving a distributed ledger, wherein the distributed ledger comprises data blocks,
- a fourth computation unit, configured for determining a set of data blocks contained in the distributed ledger with a fourth computation unit, wherein each data block of the first set of data blocks comprises a timestamp transaction comprising the hash of the dataset, wherein the timestamp transaction comprises a verification time being earlier than or equal to the non-verified verification time, furthermore configured for verifying the timestamp based on the set of data blocks with the fourth computation unit.

In particular, the timestamp verification system for verifying a timestamp can be configured to execute the method for verifying a timestamp according to the invention and its aspects. The timestamp verification system is configured to execute the method and its aspects by its fourth interface and its fourth computation unit being configured to execute the respective method steps.

The timestamp verification system can be realized as a data processing system or as a part of a data processing system. Such a data processing system can, for example, comprise a cloud-computing system, a computer network, a computer, a tablet computer, a smartphone or the like. The timestamp verification system can comprise hardware and/or software. The hardware can be, for example, a processor system, a memory system and combinations thereof. The hardware can be configurable by the software and/or be operable by the software.

The timestamp verification system can be realized as a server or as part of a server; alternatively, the timestamp verification system can be realized as a client or as part of a client; alternatively, the timestamp verification system can be realized as combination of a server and a client.

In a further embodiment, the invention relates to a block system for creating and including a further data block into a distributed ledger, the block system comprising a transaction creation system, a block creation system and a block verification system, to a transaction creation system for providing a further timestamp transaction, the transaction creation system comprising:
- a second interface, configured for receiving a hash of a dataset,
furthermore configured for providing the further timestamp transaction
- a second computation unit, configured for determining a second time by querying a time server, furthermore configured for determining a further verification time based on the second time, wherein the further verification time is later than the second time, furthermore configured for determining the further timestamp transaction, wherein the further timestamp transaction comprises the hash of the dataset and the further verification time, and optionally the second time; the block creation system comprising:
- a first interface, configured for receiving a further timestamp transaction, wherein the further timestamp transaction comprises a hash of a dataset and the further verification time, furthermore configured for receiving a distributed ledger with the first interface, wherein the distributed ledger comprises data blocks,
- a first computation unit, configured for determining a first time by querying a time server, furthermore configured for performing a first check based on the first time and the further verification time, furthermore configured for, in the case of a positive first check, determining the further data block based on the distributed ledger, wherein the further data block comprises the further timestamp transaction; and the block verification system comprising:
- a third interface, configured for receiving the further data block, wherein the further data block comprises a further timestamp transaction, furthermore configured for receiving the distributed ledger,
- a third computation unit, configured for determining a third time by querying a time server, furthermore configured for verifying the further data block based on the third time, and optionally based on the distributed ledger, furthermore configured for, in case of a positive verification, including the further data block into the distributed ledger.

The block system can comprise all advantageous features and embodiments of the transaction creation system, the block creation system and the block verification system it consists of.

At least one embodiment of the invention furthermore relates to a computer program product comprising program elements, directly loadable into a memory unit of a block creation system and/or directly loadable into a memory unit of a transaction creation system and/or directly loadable into a memory unit of a block verification system, which induces the block creation system to carry out the steps of the method for determining a further data according to one of the embodiments, and/or which induces the transaction creation system to carry out the steps of the method for determining a further timestamp transaction according to an embodiment, and/or which induces the block verification system to execute the method for inserting a further data block into a distributed ledger according to an embodiment, when the program elements are executed by the block creation system and/or the transaction creation system and/or the block verification system.

A further possible embodiment of the invention relates to a computer program product comprising program elements, directly loadable into a memory unit of a block creation system, which induces the block creation system to carry out the steps of the method for determining a further data according to one of the embodiments, when the program elements are executed by the block creation system.

A further possible embodiment of the invention relates to a computer program product comprising program elements, directly loadable into a memory unit of a transaction creation system, which induces the transaction creation system to carry out the steps of the method for determining a further timestamp transaction according to an embodiment, when the program elements are executed by the transaction creation system.

A further possible embodiment of the invention relates to a computer program product comprising program elements, directly loadable into a memory unit of a block verification system, which induces the block verification system to execute the method for inserting a further data block into a distributed ledger according to an embodiment, when the program elements are executed by the block verification system.

A further possible embodiment of the invention relates to a computer program product comprising program elements, directly loadable into a memory unit of a timestamp verification system, which induces the timestamp verification system to execute the method for verifying a timestamp according the invention and its embodiments, when the program elements are executed by the timestamp verification system.

A further possible embodiment of the invention relates to a computer program product comprising program elements, directly loadable into a memory unit of a block system, which induces the block system to execute the method for creating and inserting a further timestamp transaction into a distributed ledger according the invention and its embodiments, when the program elements are executed by the block system.

At least one embodiment of the invention furthermore relates to a computer-readable medium on which program elements are stored that can be read and executed by a block creation system and/or a transaction creation system and/or a block verification system, in order to perform steps of the of the method for determining a further data block according to one of the embodiments, and/or in order to perform steps of the method for determining a further timestamp transaction according to an embodiment, and/or in order to perform steps of the method for inserting a further data block into a distributed ledger according to an embodiment, when the program elements are executed by the block creation system and/or the transaction creation system and/or the block verification system.

A further possible embodiment of the invention relates to a computer-readable medium on which program elements are stored that can be read and executed by a block creation system, in order to perform steps of the of the method for determining a further data block according to one of the embodiments, when the program elements are executed by the block creation system.

A further possible embodiment of the invention relates to a computer-readable medium on which program elements are stored that can be read and executed by a transaction creation system, in order to perform steps of the method for determining a further timestamp transaction according to an embodiment, when the program elements are executed by the transaction creation system.

A further possible embodiment of the invention relates to a computer-readable medium on which program elements are stored that can be read and executed by a block verification system, in order to perform steps of the method for inserting a further data block into a distributed ledger according to an embodiment, when the program elements are executed by the block verification system.

A further possible embodiment of the invention relates to a computer-readable medium on which program elements are stored that can be read and executed by a timestamp verification system, in order to perform steps of the method for verifying a timestamp according to an embodiment of the invention and its aspects, when the program elements are executed by the timestamp verification system.

A further possible embodiment of the invention relates to a computer-readable medium on which program elements are stored that can be read and executed by a block verification system, in order to perform steps of the method for creating and inserting a further timestamp transaction into a distributed ledger according an embodiment of the invention and its aspects, when the program elements are executed by the block system.

The realization of embodiments of the invention by a computer program product and/or a computer-readable medium has the advantage that already existing systems can be easily adopted by software updates in order to work as proposed by embodiments of the invention.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

FIG. 1 displays a part of an embodiment of a distributed ledger LDG, wherein in this embodiment the distributed ledger LDG is a blockchain.

The distributed ledger LDG comprises data blocks TSB.1, ..., TSB.3, FTSB, wherein each of the data blocks TSB.1, ..., TSB.3, FTSB is linked to another data block TSB.1, ..., TSB.3 (in this embodiment, the data block TSB.1 is linked to a data block which is not displayed). A link between two data blocks TSB.1, ..., TSB.3, FTSB is a directional information, this means that for each link there is a well-defined start of the link and a well-defined end of the link. In particular, if a first data block TSB.1, ..., TSB.3, FTSB is linked to a second data block TSB.1, ..., TSB.3, FTSB, this means that the first data block TSB.1, ..., TSB.3, FTSB is the start of the link and the second data block TSB.1, ..., TSB.3, FTSB is the end of the link. In other words, a first data block TSB.1, ..., TSB.3, FTSB being linked to a second data block TSB.1, ..., TSB.3, FTSB does not imply that the second data block TSB.1, ..., TSB.3, FTSB is linked to the first data block TSB.1, ..., TSB.3, FTSB.

In this embodiment, each data block TSB.1, ..., TSB.3, FTSB is linked to exactly one other data block TSB.1, ..., TSB.3, FTSB. Alternatively, a data block TSB.1, ..., TSB.3, FTSB can be linked to several other data blocks TSB.1, ..., TSB.3, FTSB. In particular, each data block TSB.1, ..., TSB.3, FTSB can be linked to a fixed number of other data blocks TSB.1, ..., TSB.3, FTSB. A data block TSB.1, ..., TSB.3, FTSB can also be linked to itself.

Alternatively, the distributed ledger LDG can also comprise data blocks which are non-timestamp data blocks TSB.1, ..., TSB.3, FTSB, in other words, which are not related to timestamps or do not contain a timestamp or a timestamp transaction TST.1, ..., TST.3, FIST. For example, the data blocks TSB.1, ..., TSB.3, FTSB documenting timestamp transactions TST.1, ..., TST.3, FIST can be embedded into a distributed ledger LDG storing other data, e.g. within the Bitcoin blockchain. In this case, data blocks TSB.1, ..., TSB.3, FTSB can also be linked to non-timestamp data blocks and vice versa.

In this embodiment, a first data block TSB.1, ..., TSB.3, FTSB is linked to a second data block TSB.1, ..., TSB.3, FTSB by the first data block TSB.1, ..., TSB.3, FTSB comprising a hash H(TSB.0), ..., H(TSB.3) of the second data block TSB.1, ..., TSB.3, FTSB. Alternatively, other link information can be included into the first data block TSB.1, ..., TSB.3, FTSB to indicate that it is linked to the second data block TSB.1, ..., TSB.3, FTSB. In this embodiment, the H(TSB.0), ..., H(TSB.3) is the result of the application of the SHA256 hash function on the second data block TSB.1, ..., TSB.3, FTSB. In particular, the SHA256 hash function is applied to a concatenation of the contents of the second data block TSB.1, ..., TSB.3, FTSB. In particular, for inserting a data block TSB.1, ..., TSB.3, FTSB into the distributed ledger LDG, a consensus algorithm (e.g. proof of work, proof of storage, proof of stake, proof of elapsed time) must be executed, wherein the consensus algorithm may be based on choosing the nonce RN.1, RN.2, RN.3, FRN of the data block TSB.1, ..., TSB.3, FTSB to be inserted. In this embodiment, the nonce RN.1, RN.2, RN.3, FRN must be chosen by the creator of the data block TSB.1, ..., TSB.3, FTSB such that the hash H(TSB.1), ..., H(TSB.3), H(FTSB) of the data block TSB.1, ..., TSB.3, FTSB fulfills a certain condition. In this embodiment, the condition is that the hash H(TSB.1), ..., H(TSB.3), H(FTSB) of the data block TSB.1, ..., TSB.3, FTSB is smaller than a given threshold.

In this embodiment, each data block TSB.1, ..., TSB.3, FTSB furthermore comprises a block time CT.1, CT.2, CT.3, FCT of the data block TSB.1, ..., TSB.3, FTSB. In this embodiment, the block time CT.1, CT.2, CT.3, FCT is the time the block was created and sent to all nodes for including into their local copy of the distributed ledger LDG. Alternatively, the block time CT.1, CT.2, CT.3, FCT can be the time the creation of the data block TSB.1, ..., TSB.3, FTSB has been started (e.g. before starting proof of work). Alternatively, the block time CT.1, CT.2, CT.3, FCT can also be based on the creation tome of the timestamp transactions TST.1, ..., TST.3, FIST. In particular, the methods for creating and verifying the timestamps do not rely on the correctness of the block time CT.1, CT.2, CT.3, FCT contained in the data block TSB.1, ..., TSB.3, FTSB, so there need to be no strict requirement on the block time. Alternatively, the block time CT.1, CT.2, CT.3, FCT contained in the data blocks TSB.1, ..., TSB.3, FTSB can also be verified when inserting the data block TSB.1, ..., TSB.3, FTSB into the ledger LDG.

In this embodiment, each data block TSB.1, ..., TSB.3, FTSB comprises at least one timestamp transaction TST.1, ..., TST.3, FIST. In particular, each data block TSB.1, ..., TSB.3, FTSB can comprise several timestamp transactions TST.1, ..., TST.3, FIST. Alternatively, each data block TSB.1, ..., TSB.3, FTSB can comprise a predefined number of timestamp transactions TST.1, ..., TST.3, FIST, in particular, the predefined number could be one. Furthermore, it is possible that there are data blocks TSB.1, ..., TSB.3, FTSB not comprising a timestamp transaction TST.1, ..., TST.3, FIST.

In this embodiment, a timestamp transaction TST.1, ..., TST.3, FIST comprises a hash H(DS.1), ..., H(DS.3), H(FDS) of a dataset DS.1, DS.2, DS.3, FDS and a verification time VT.1, ..., VT.3, FVT. The dataset DS.1, DS.2, DS.3, FDS can be an unencrypted dataset or an encrypted dataset. In this embodiment, the hash H(DS.1), ..., H(DS.3), H(FDS) of a dataset DS.1, DS.2, DS.3, FDS is the result of the application of the SHA256 hash function on the dataset DS.1, DS.2, DS.3, FDS, but alternatively every other hash function can be used.

In this embodiment, a single timestamp transaction TST.1, ..., TST.3, FIST can be contained in several data blocks TSB.1, ..., TSB.3, FTSB. For example, the timestamp transaction TST.1 is contained in the data blocks TSB.1 and TSB.2, the timestamp transaction TST.2 is contained in the data blocks TSB.1, TSB.2 and TSB.3, and the timestamp transaction TST.3 is contained only in the data block TSB.2.

A first and a second timestamp transaction TST.1, ..., TST.3, FIST can be considered as equal, if a first hash H(DS.1), ..., H(DS.3), H(FDS) contained in the first timestamp transaction TST.1, ..., TST.3, FIST equals a second hash H(DS.1), ..., H(DS.3), H(FDS) contained in the second timestamp transaction TST.1, ..., TST.3, FIST. Alternatively, first and a second timestamp transaction TST.1, ..., TST.3, FIST can be considered as equal, if additionally a first verification time VT.1, VT.2, VT.3, FVT contained in the first timestamp transaction TST.1, ..., TST.3, FIST equals a second verification time VT.1, VT.2, VT.3, FVT contained in the second timestamp transaction TST.1, ..., TST.3, FIST.

In particular, for each data block TSB.1, ..., TSB.3, FTSB the verification time VT.1, ..., VT.3, FVT of the timestamp transaction TST.1, ..., TST.3, FIST is later than the block time CT.1, ..., CT.3, FCT. If the data block TSB.1, ..., TSB.3, FTSB contains several timestamp transactions TST.1, ..., TST.3, FIST, each of the verification times VT.1, ..., VT.3, FVT is later than the block time CT.1, ..., CT.3, FCT of the data block TSB.1, ..., TSB.3.

The verification time VT.1, ..., VT.3, FVT and/or the block time CT.1, ..., CT.3, FCT can comprise both a date and a time information. The verification time VT.1, ..., VT.3, FVT and/or the block time CT.1, ..., CT.3, FCT are in this embodiment given as integer number counting time spans since a defined origin of the time scale (e.g. giving the number of milliseconds since Jan. 1, 1970 midnight). Alternatively the verification time VT.1, ..., VT.3, FVT and/or the block time CT.1, ..., CT.3, FCT can be given as a composite date format with several numbers, corresponding to year, month, day, hour, second and/or millisecond.

Figure 2:
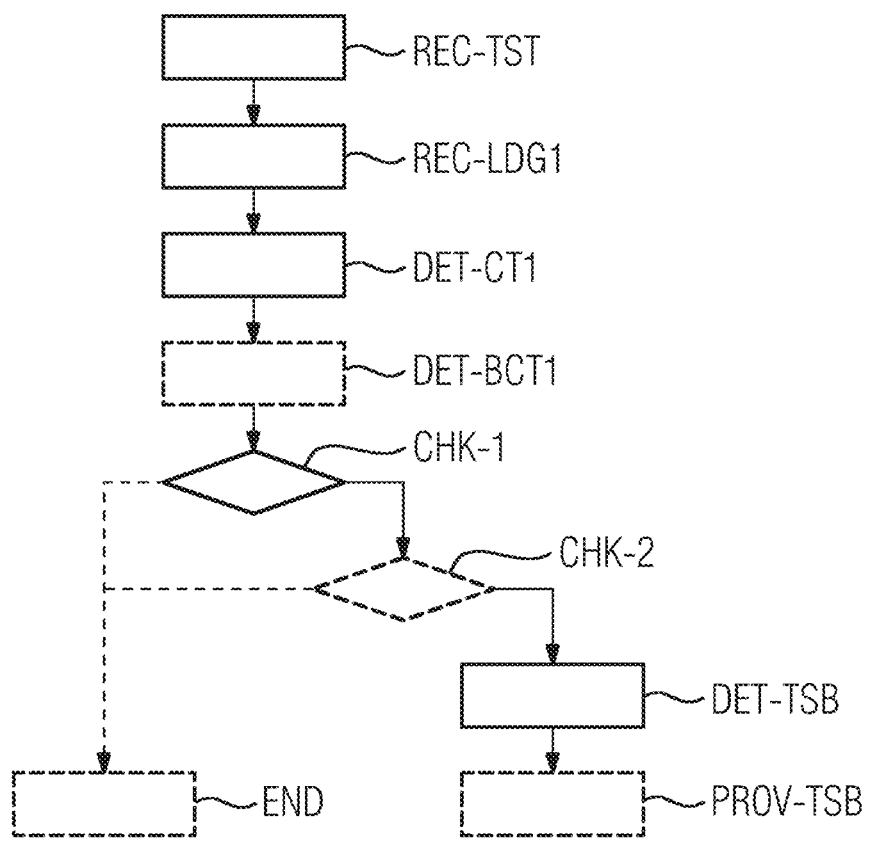
FIG. 2 displays an embodiment of the method for determining a further data block, FIG. 3 displays an embodiment of the method for providing a further timestamp transaction, FIG. 4 displays an embodiment of the method for including a further data block, FIG. 5 displays an embodiment of the method for verifying a timestamp, FIG. 6 displays an embodiment of a joint method for providing a further timestamp transaction, determining a further data block and verifying the further data block, FIG. 7 displays a block creation system, a transaction creation system and a block verification system, FIG. 8 displays a timeline comprising the first time, the second time, the third time and the further verification time.

FIG. 2 displays an embodiment of the method for determining a further data block FTSB. In particular, this embodiment can be executed by a block creation system BCS, in particular, by a first interface IF.1 of the block creation system BCS and a first computation unit CU.1 of the block creation system BCS.

The first step of the displayed method is receiving REC-TST a further timestamp transaction FIST with the first interface IF.1. In this embodiment the further timestamp transaction FIST comprises a hash H(FDS) of a dataset FDS and a further verification time FVT. The dataset FDS can alternatively be denoted as "further dataset" FDS.

The dataset FDS can be an encrypted dataset or an unencrypted dataset. In particular, the block creation system BCS does not need any further information with respect to the further dataset FDS, only the hash H(FDS) of the dataset FDS is needed for executing the method.

In an alternative embodiment, the further timestamp transaction FIST can be selected from a plurality of timestamp transactions TST.1, ..., TST.3. For example, the plurality of timestamp transactions TST.1, ..., TST.3 can be downloaded from a public server providing pending timestamp transactions TST.1, ..., TST.3. In particular, the selection of the further timestamp transaction FIST can be based on a cryptocurrency transaction fee contained in the plurality of timestamp transactions TST.1, ..., TST.3.

The second step of the displayed embodiment is receiving REC-LDG1 a distributed ledger LDG with the first interface IF.1. The distributed ledger LDG comprises data blocks TSB.1, ..., TSB.3, wherein each of the data blocks TSB.1, ..., TSB.3 is linked to at least one preceding data block TSB.1, ..., TSB.3 of the distributed ledger LDG.

In this example, the distributed ledger LDG (without the further data block FTSB) being a blockchain displayed in FIG. 1 is received. Here, each of the data blocks TSB.1, ..., TSB.3 is linked to at least one preceding data block TSB.1, ..., TSB.3 of the distributed ledger LDG by comprising the H(TSB.0), ..., H(TSB.2) of the preceding data block TSB.1, TSB.2. In particular there is an origin data block (or several origin data blocks), which is not linked to any other preceding data block.

In particular, the data blocks TSB.1, ..., TSB.3 of the distributed ledger LDG can be indexed by an integer number, so that the data block TSB.1, ..., TSB.3 with the index n is the successor of the data block TSB.1, ..., TSB.3 with index (n+1). Furthermore, the origin data block can be indexed with the integer 0.

Optionally, within this step of receiving the distributed ledger LDG the integrity of the distributed ledger LDG can be checked. For example, it can be tested whether all data blocks TSB.1, ..., TSB.3 have correct links to other data blocks TSB.1, ..., TSB.3. Furthermore, it can be tested that the consensus mechanism has been executed exactly, in this embodiment, this is equivalent with checking that the nonce RN.1, ..., RN.3 of the data block TSB.1, ..., TSB.3 is chosen such that the hash H(TSB.1), ..., H(TSB.3) of the data block TSB.1, ..., TSB.3 fulfills the predefined requirement. Furthermore, it can be verified that all timestamp transactions TST.1, ..., TST.3 are correct.

The next step of the displayed embodiment is determining DET-CT1 a first time T.1 by querying a time server with a first computation unit CU.1.

In this embodiment, the time server is spatially remote from the block creation system BCS, and is queried by the internet. Furthermore, the time server uses a time reference based on GPS.

In particular, the time server to be used is given by the distributed ledger LDG (in particular, by providing an uniform resource locator directing to the time server). Alternatively, the time server can be configured by a user and stored in the block creation system BCS. In both cases, the authenticity of the time server can be checked based on a digital certificate of the server, in particular using a challenge response procedure.

In this embodiment, querying the server is done by calling a function of an application programmable interface (an acronym is API) of the time server. In particular, querying the API can be implemented by the block creation system BCS and the time server exchanging HTTP (acronym for "Hypertext Transfer Protocol) requests and responses. Alternatively, the time server can send the first time T.1 without being triggered by the block creation system BCS.

A further optional step of the displayed embodiment is determining DET-BCT1 an average block creation time based on the distributed ledger LDG with the first computation unit CU.1, wherein performing CHK-1 the first check is furthermore based on the average block creation time.

In this embodiment, the average block creation time is determined based on a subset of the data blocks TSB.1, ..., TSB.3 of the distributed ledger LDG. In particular, the average block creation time is determined based on the last N data blocks TSB.1, ..., TSB.3 of the distributed ledger LDG.

In particular, the block creation time of a single data block TSB.1, ..., TSB.3 can be determined based on the block time CT.1, ..., CT.3 stored in the single data block TSB.1, ..., TSB.3, and on the block time CT.1, ..., CT.3 stored in a preceding and/or succeeding data block TSB.1, ..., TSB.3. Here, the block creation time $\Delta t_{BC}^{(n)}$ of the n-th data block TSB.1, ..., TSB.3 is calculated as $\Delta t_{BC}^{(n)} = t_{CT}^{(n)} - t_{CT}^{(n-1)}$ the difference between the block time $t_{CT}^{(n)}$ of the n-th block and the block time $t_{CT}^{(n-1)}$ of the (n−1)-th block.

The average block creation time $\Delta t_{BC}$ can then be calculated as $$\Delta t_{BC} = \frac{1}{N} \sum_{n=\#TDB-N}^{\#TDB} t_{CT}^{(n)} - t_{CT}^{(n-1)}.$$

Alternatively, also a weighted averaged can be used. Furthermore, the distributed of single block creation times $\Delta t_{BC}^{(n)}$ can be taken into account, e.g. by using a quantile as the average block creation time $\Delta t_{BC}$.

A further step of the displayed embodiment is performing CHK-1 a first check based on the first time T.1 and the further verification time FVT with the first computation unit CU.1.

In this embodiment, the first time T.1 (being the current time of the time server) and the further verification time FVT are compared by testing $t_{verify} < t_{current} + \Delta t_{grace}$, where $t_{verify}$ is the further verification time FVT, $t_{current}$ is the first time T.1 and $\Delta t_{grace}$ is a grace timespan, which is a timespan being zero or larger.

In this embodiment, the grace timespan $\Delta t_{grace}$ is chosen as $\Delta t_{grace} = a \cdot \Delta t_{BC}$ with a≥1, which ensures that there is enough time for executing the remaining steps of the creation of the block.

By this check, it is ensured that no further actions are done if the further verification time FVT is in the past, because the generated block would be invalid and not be accepted by other nodes, the further action would have no effect. Furthermore, by using the grace timespan $\Delta t_{grace}$ the time necessary for the further creation of the further data block FTSB (e.g. for the proof of work) can be taken into account, so that the further verification time FVT is not in the past even after creation of the further data block FTSB.

In particular, if the result of the first check is negative, no further method step is executed. If the result of the first check is positive, the next method step of performing CHK-2 a second check is executed.

A further optional step of the displayed method is performing CHK-2 a second check based on the distributed ledger LDG and the further timestamp transaction FIST with the first computation unit CU.1. Here the determining DET-TSB of the further data block FTSB is only executed in the case of a positive second check. In particular, the second check is positive if the number of data blocks TSB.1, ..., TSB.3 related to the further timestamp transaction FIST contained in the distributed ledger LDG is below a given threshold number.

In this embodiment, a data block TSB.1, ..., TSB.3 is related to the further timestamp transaction FIST if the data block TSB.1, ..., TSB.3 comprises a timestamp transaction TST.1, ..., TST.3 comprising the same hash H(DS.1), ..., H(DS.3) as the hash H(FDS) contained in the further timestamp transaction FIST. Furthermore, the threshold equals the number of data block TSB.1, ..., TSB.3 a timestamp transaction TST.1, ..., TST.3 needs to be contained in to be considered as valid.

In this embodiment, for performing CHK-2, the data blocks TSB.1, ..., TSB.3 contained in the distributed ledger LDG are iterated, as well as the timestamp transactions TST.1, ..., TST.3 in each data block TSB.1, ..., TSB.3. For each timestamp transaction TST.1, ..., TST.3 it is determined whether the contained hash H(DS.1), ..., H(DS.3) is equal to the hash H(FDS) of the further timestamp transactions FIST, if they are determined as equal, a counter is increased. At the end of the iterations the counter is compared with the threshold.

In particular, if the result of the second check is negative, no further method step is executed. If the result of the second check is positive, the next method step of determining DET-TSB the further data block FTSB is executed.

The last step of the displayed embodiment is determining DET-TSB the further data block FTSB to be inserted into the distributed ledger LDG with the first computation unit CU.1, wherein the further data block FTSB comprises the further timestamp transaction FIST.

In particular, for determining DET-TSB the further data block FTSB a preceding data block TSB.3 has to be determined. In this embodiment, the distributed ledger LDG is a blockchain and the preceding data block TSB.3 is the last data block TSB.1, ..., TSB.3 of the distributed ledger LDG. Alternatively, and in particular if the distributed ledger LDG is a tangle, the preceding data block TSB.3 can be determined based on properties (for example weights) of the data blocks TSB.1, ..., TSB.3 of the distributed ledger LDG.

In this embodiment, the further data block FTSB comprises a block time FCT, wherein the block time is equal to the first time T.1.

In particular, for determining DET-TSB the further data block FTSB a proof of work has to be executed by the first computation unit CU.1. Here, the nonce FRN of the further data block FTSB has to be calculated such that the hash H(FTSB) of the further data block FTSB fulfills a condition, wherein the condition is that the value of the hash H(FTSB) is below a given threshold. In particular, the hash H(FTSB) can be calculated as H(FTSB)=H(FTST & H(TSB.3) & FRN)=H(H(FDB) & FVT & H(TSB.3) & FRN), wherein H(TSB.3) is the hash of the preceding data block TSB.3. Alternatively, the hash H(FTSB) can be calculated as H(FTSB)=H(FTST & FCT & H(TSB.3) & FRN)=H(H (FDB) & FVT & FCT & H(TSB.3) & FRN). Here the operator "&" is a concatenation of the data, for example a concatenation of strings or the sum of the respective data interpreted as number.

A further optional step of the displayed embodiment is providing PROV-TSB the further data block FTSB with the first interface IF.1. In particular, the further data block FTSB can be send to other nodes participating in the distributed ledger network, in particular to block verification systems BVS.

TABLE A

Pseudocode for creating a data block

| | |
|---|---|
| A.1 | func create_block(h_data, t_vrfy): |
| A.2 | t_curr = time_server.time( ) |
| A.3 | for n in [1, 10]: |
| A.4 | creation_times.append(ledger.blocks[−n].t_curr − ledger.blocks[−n+1].t_curr) |
| A.5 | t_avg = avg(creation_times) |
| A.6 | if t_vrfy > t_curr + a*t_avg: |
| A.7 | return |
| A.8 | counter = 0 |
| A.9 | for db in ledger.blocks: |
| A.10 | if db.timestamp.h_data = h_data |
| A.11 | counter += 1 |
| A.12 | if counter >= vrfy_number: |
| A.13 | return |

TABLE A-continued

Pseudocode for creating a data block

| | |
|---|---|
| A.14 | my_timestamp = create_timestamp(h_data, t_vrfy) |
| A.15 | my_prev_hash = SHA256(ledger.blocks[−1]) |
| A.16 | nonce = 0 |
| A.17 | while SHA256(my_timestamp, my_prev_hash, nonce) < b: |
| A.18 | nonce += 1 |
| A.19 | new_block = create_block(my_timestamp) |
| A.20 | new_ block.prev_hash = my_prev_hash |
| A.21 | new_block.nonce = nonce |
| A.22 | new_block.t_curr = time_server.time( ) |
| A.23 | Return new_block |

In Table A, a further embodiment of the method for determining DET-TBS a further data block FTSB is described in terms of pseudocode.

In line A.1, the function takes as parameter the hash H(FDS) of a dataset FDS (parameter "h_data") and the further verification time FVT (variable "t_vrfy"). Alternatively, the function "create block" could also receive the further timestamp transaction FIST as parameter, the further timestamp transaction FIST comprising the hash H(FDS) of the dataset FDS and the further verification time FVT. This line corresponds to the method step of receiving REC-TST the further timestamp transaction FIST.

In line A.2, the first time T.1 (variable "t_curr") is determined DET-CT1 by calling an API function of a time server.

In lines A.3 to A.5 the average block creation time (variable "t_avg") is determined DET-BCT1 by averaging the differences of the block time CT.1, . . . , CT.3 of a data block TSB.1, . . . , TSB.3 and the block time CT.1, . . . , CT.3 of its preceding data block TSB.1, . . . , TSB.3. Note that here the python notation for indexing lists or sorted arrays is used, which means that array[−1] refers to the last item of the array, array[−2] refers to the second-to-last item of the array, etc., so that the average block creation time is averaged over 10 time differences.

In lines A.6 and A.7, the first check is performed CHK-1 based on the first time T.1 and the further verification time FVT, in particular, it is checked that the further verification time FVT is later than the sum of the first time T.1 and the average block creation time multiplied with a float "a". The float "a" can be configured within the system, an example for a reasonable choice would be a=1.5.

In lines A.8 to A.13, the second check is performed CHK-2 based on the distributed ledger LDG. Here the number of data blocks TSB.1, . . . , TSB.3 comprising the hash H(FDS) of the dataset FDS is counted, and the second check is negative, if the number is higher than a threshold "vrfy_number", wherein the verification number is the number a certain timestamp transaction TST.1, . . . , TST.3, FIST must occur in the distributed ledger LDG, in order to recognized the timestamp transaction TST.1, . . . , TST.3, FIST as valid.

In lines A.15 to A.22, the further data block FTSB is determined DET-TSB (variable "new block"). Therefore, in lines A.15 to A.17 the proof of work is executed by calculating the nonce FRN, and in lines A.19 to A.23 the further data block FTSB is actually created and provided PROV-TSB.

Note that within this embodiment each data block TSB.1, . . . , TSB.3, FTSB is restricted to contain only one timestamp transaction TST.1, . . . , TST.3, FIST. In a slightly modified version (for example, including iterations over the timestamp transactions TST.1, . . . , TST.3, FIST contained in a data block TSB.1, . . . , TSB.3, FTSB) the code is also suited for dealing with an arbitrary number of timestamp transactions TST.1, . . . , TST.3, FIST in a data block TSB.1, . . . , TSB.3, FTSB.

Figure 3:
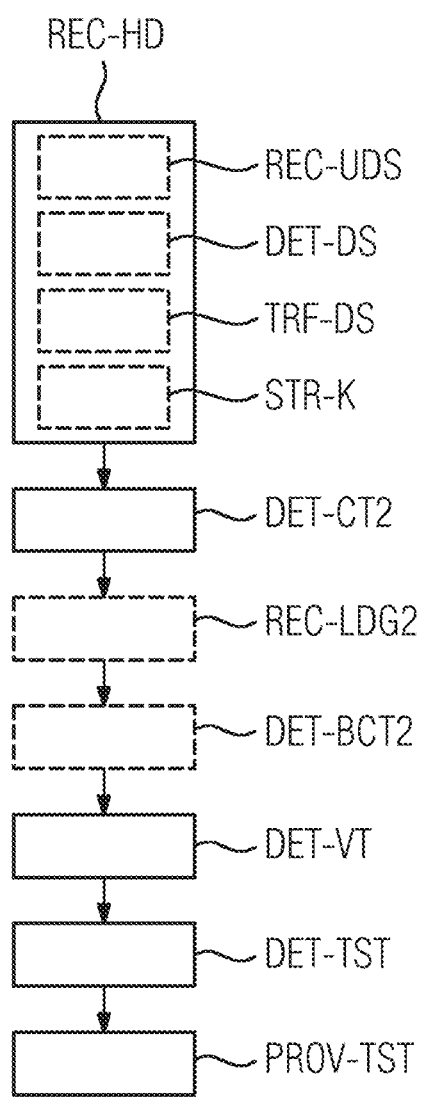

FIG. 3 displays an embodiment of the method for providing a further timestamp transaction FIST. In particular, this embodiment can be executed by a transaction creation system TCS, in particular, by a second interface IF.2 of the transaction creation system TCS and a second computation unit CU.2 of the transaction creation system TCS. Furthermore, the transaction creation system TCS can comprise a second memory unit MU.2.

The first step of the displayed embodiment is receiving REC-HD a hash H(FDS) of a dataset FDS with a second interface IF.2. Within this embodiment, the step of receiving the hash H(FDS) of the dataset FDS comprises the substeps of receiving REC-UDS an unencrypted dataset with the second interface IF.2, determining DET-DS the dataset FDS by symmetrically encrypting the unencrypted dataset based on a key with the second computation unit CU.2, transferring TRF-DS the dataset FDS to an external storage service with the second computation unit CU.2, storing STR-K the key of the symmetric encryption within a second memory unit MU.2, and determining DET-HDS the hash H(FDS) of the dataset FDS with the second computation unit CU.2.

In this embodiment, the symmetric encryption is based on the "Advanced Encryption Standard" (an acronym is "AES", the algorithm is also denoted as "Rijndael") with a key length of 256 bits. It is also possible to use other key lengths. Furthermore, other symmetric encryption algorithms can be used, e.g. "Twofish", "Serpent", "Blowfish", "CASTS", "Kuznyechik", "RC4", "3DES", "Skipjack", "Safer+/++" and/or "IDEA".

Since the dataset FDS is encrypted, the external storage service does not need any particular safety regulations. In particular, the external storage service can also be accessible to the public. In contrast, the key of the symmetric encryption has to be stored locally and must not be published. Transferring TRF-DS the dataset FDS to the external storage service relies in this embodiment on the "FTP" protocol (acronym for "File Transfer Protocol"), but also other transfer protocols can be used, e.g. HTTP or WebDAV.

In this embodiment, the hash H(FDS) of the dataset FDS is the result of the application of the SHA256 hash function to the dataset FDS. In particular, also other hash algorithms can be used.

Alternatively to the described encryption procedure, the hash H(FDS) of the dataset can also directly be received by the second interface IF.2.

The next step of the displayed embodiment is determining DET-CT2 a second time T.2 by querying a time server with a second computation unit CU.2.

In this embodiment, the time server is spatially remote from the transaction creation system TCS, and is queried by the internet. Furthermore, the time server uses a time reference based on GPS.

In particular, the time server to be used is given by the distributed ledger LDG (in particular, by providing an uniform resource locator directing to the time server). Alternatively, the time server can be configured by a user and stored in the transaction creation system TCS. In both cases, the authenticity of the time server can be checked based on a digital certificate of the server, in particular using a challenge response procedure.

In this embodiment, querying the server is done by calling a function of an application programmable interface (an acronym is API) of the time server. In particular, querying the API can be implemented by the timestamp creation system TCS and the time server exchanging HTTP (acronym for "Hypertext Transfer Protocol) requests and responses. Alternatively, the time server can send the second time T.2 without being triggered by the transaction creation system TCS.

The next step of the displayed embodiment is receiving REC-LDG2 a distributed ledger LDG with the second interface IF.2, wherein the distributed ledger LDG comprises data blocks TSB.1, ..., TSB.3. In particular, each of the data blocks TSB.1, ..., TSB.3 is linked to at least one preceding data block TSB.1, ..., TSB.3 of the distributed ledger LDG. This step and the distributed ledger LDG received can comprise all advantageous features and embodiments described in FIG. 2 with respect to the step of receiving REC-LDG1 the distributed ledger LDG.

The next step of the displayed embodiment is determining DET-BCT2 an average block creation time based on the distributed ledger LDG with the second computation unit CU.2. This step and the average block creation time can comprise all advantageous features and embodiments described in FIG. 2 with respect to the step of determining DET-BCT the average block creation time.

A further step of the displayed embodiment is determining DET-VT a further verification time FVT based on the second time T.2 with the second computation unit CU.2, wherein the further verification time FVT is later than the second time T.2. In particular, in this embodiment the further verification time FVT is furthermore based on the average block creation time.

In this embodiment, the further verification time FVT is chosen such that there is enough time to insert the further timestamp transaction FIST comprising the further verification time FVT into a certain number of data blocks TSB.1, ..., TSB.3, FTSB of the distributed ledger LDG, so that the respective data blocks TSB.1, TSB.3, FTSB can be created before the current time is later than the further verification time FVT.

In particular, if N denotes the number of data blocks TSB.1, TSB.3, FTSB comprising the further timestamp transaction FIST that need to be contained in the distributed ledger LDG in order to safely verify the further timestamp transaction FIST, the further verification time FVT is in this embodiment chosen as $t_{verify} < t_{current} + c \cdot N \cdot \Delta t_{BC}$, wherein c is a positive real number, $t_{verify}$ is the further verification $t_{verify}$ time FVT, $t_{current}$ is the second time T.2 and $\Delta t_{BC}$ is the average block creation time. In particular, c is chosen as c>1, an advantageous embodiment is c=1.5.

A further step of the displayed embodiment is determining DET-TST the further timestamp transaction FIST with the second computation unit CU.2, wherein the further timestamp transaction FIST comprises the hash H(FDS) of the dataset FDS and the further verification time FVT, and optionally the second time T.2.

Alternatively, in the step of is determining DET-TST the further timestamp transaction FIST a cryptocurrency transaction fee can be determined, and/or a transaction of cryptocurrency from a first account to a second account can be determined, wherein the first account is related to the transaction creation system TCS (or the owner and/or operator of the transaction creation system TCS). The second account can be a placeholder to be filled by the block creation system BCS determining the further data block FTSB, so that the second account is then related to the block creation system BCS (or the owner and/or operator of the block creation system BCS).

The last step of the displayed embodiment is providing PROV-TST the further timestamp transaction FIST with the second interface IF.2. In this embodiment, the further timestamp transaction FIST is directly sent to one or more block creation systems BCS. Alternatively, the further timestamp transaction FIST can also be published on a webserver or another repository to be picked by a block creation system BCS.

TABLE B

Pseudocode for creating a further timestamp transaction

| B.1 | func create_timestamp_tran(h_data): |
| B.2 | t_curr = time_server.time( ) |
| B.3 | for n in [1, 10] : |
| B.4 | creation_times.append(ledger.blocks[-n].t_curr − ledger.blocks[-n+1].t_curr) |
| B.5 | t_avg = avg(creation_times) |
| B.6 | t_vrfy = t_curr + c*vrfy_number*t_avg |
| B.7 | my_timestamp = create_timestamp(h_data, t_vrfy) |
| B.8 | return timestamp |

Table B shows pseudocode implementing a first embodiment of the method for providing a further timestamp transaction FIST. In line B.1, the hash H(FDS) of the dataset FDS is received REC-HD as parameter of the function "create_timestamp_trans" (variable "h_data"). In line B.2, the second time T.2 (variable "t_curr" is determined DET-CT2 by querying a time server.

The lines B.3 to B.5 correspond to the lines A.3 to A.5 of table A, here the average block creation time (variable "t_avg") is determined DET-BCT2 based on the distributed ledger LDG (variable "ledger").

Within the line B.6, the further verification time FVT (variable "t_verify") is determined DET-VT based on the second time T.2 and the average block creation time. Here, the average block creation time is multiplied with the number (variable "vrfy_number") of data blocks TSB.1, ..., TSB.3, FTSB containing a certain timestamp transaction TST.1, ..., TST.3, FIST must be contained in the distributed ledger LDG in order to consider the certain timestamp transaction TST.1 TST.3, TST as validated. Furthermore, this product is multiplied with a global constant (variable "c").

In line B.7, the further timestamp transaction FIST (variable "my_timestamp") is determined DET-TST, and in line B.8, the further timestamp transaction FIST is provided PROV-TST as return value of the function "create_timestamp_trans".

TABLE C

Pseudocode for creating a further timestamp transaction

| C.1 | func create_timestamp_trans_data(data): |
| C.2 | key = random_key( ) |
| C.3 | data_enc = encrypt(data, key) |
| C.4 | upload(data_enc) |
| C.5 | return create_timestamp_trans(SHA256(data_enc)) |

Table C shows pseudocode implementing a second embodiment of the method for providing a further timestamp transaction FIST. In particular, within line C.1 the function "create_timestamp_trans_data" receives REC-UDS an unencrypted data set (variable "data"). This unencrypted data set is encrypted in line C.3 to become the dataset FDS (variable "data_enc"). In line C.4, this encrypted dataset FDS is uploaded to a public storage service, and in C.5 the function "create_timestamp_trans" defined in Table B is called using the hash H(FDS) of the encrypted dataset FDS as parameter.

Figure 4:
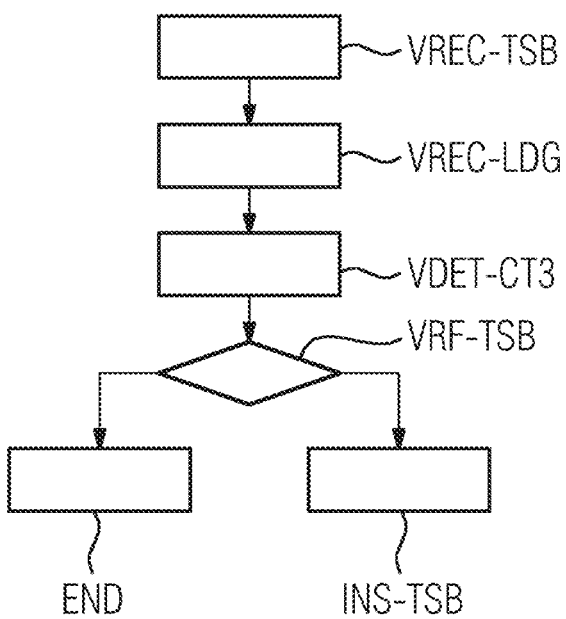

FIG. 4 displays an embodiment of the method for including a further data block FTSB determined by a method for determining a further data block FTSB according to an aspect of the invention into a distributed ledger LDG. In particular, this embodiment can be executed by a block verification system BVS, in particular, by a third interface IF.3 of the block verification system BVS and a third computation unit CU.3 of the block verification system BVS. Furthermore, the block verification system BVS can comprise a third memory unit MU.3.

The first step of the displayed embodiment is receiving VREC-TSB a further data block FTSB with a third interface IF.3, wherein the further data block FTSB comprises a further timestamp transaction FIST. In particular, the further timestamp transaction FIST comprises a hash H(FDS) of a dataset FDS and a further verification time FVT.

The next step of the displayed embodiment is receiving VREC-LDG a distributed ledger LDG with the third interface IF.3.

In this embodiment, the distributed ledger LDG has the structure displayed in FIG. 1. Furthermore, the step of receiving VREC-LDG the distributed ledger LDG as well as the distributed ledger LDG itself can comprise all advantageous features and embodiments described with respect to step REC-LDG2 of FIG. 2.

In particular, the distributed ledger LDG comprises data blocks TSB.1, ..., TSB.3, the data blocks TSB.1, ..., TSB.3 being linked to another data block TSB.1, ..., TSB.3 by comprising a hash H(TSB.1), ..., H(TSB.3) of the another data block TSB.1, ..., TSB.3. Each data block TSB.1, ..., TSB.3 comprises an arbitrary number of timestamp transactions TST.1, ..., TST.3 and a nonce RN.1, RN.2, RN.3.

A further step of the displayed embodiment is determining VDET-CT3 a third time T.3 by querying a time server with a third computation unit CU.3.

In this embodiment, the time server is spatially remote from the transaction creation system TCS, and is queried by the internet. Furthermore, the time server uses a time reference based on GPS.

In particular, the time server to be used is given by the distributed ledger LDG (in particular, by providing a uniform resource locator directing to the time server). Alternatively, the time server can be configured by a user and stored in the transaction creation system TCS. In both cases, the authenticity of the time server can be checked based on a digital certificate of the server, in particular using a challenge response procedure.

In this embodiment, querying the server is done by calling a function of an application programmable interface (an acronym is API) of the time server. In particular, querying the API can be implemented by the block verification system BVS and the time server exchanging HTTP (acronym for "Hypertext Transfer Protocol) requests and responses. Alternatively, the time server can send the third time T.3 without being triggered by the transaction creation system TCS.

A further step of the displayed embodiment is verifying VRF-TSB the further data block FTSB based on the third time T.3, and optionally based on the distributed ledger LDG, with the third computation unit CU.3.

In this embodiment, for verifying VRF-TSB the further data block FTSB a check is performed whether the further verification time FVT of the further data block FTSB is later than the third time. By this check it is ensured that the further verification time FVT is still a time in the future.

Furthermore a check is performed whether the further data block FTSB comprises the hash H(TSB.3) of the last data block TSB.3 of the distributed ledger LDG, wherein the distributed ledger LDG is a blockchain. Alternatively, it can be checked whether the further data block FTSB comprises a hash H(TSB.1), H(TSB.2), H(TSB.3) of any of the data blocks TSB.1, TSB.2, TSB.3 of the distributed ledger LDG. Furthermore, it is checked whether the hash H(FTSB) of the further data block FTSB fulfills a predefined condition, for example being smaller than a predefined threshold, in order to verify that the consensus mechanism, in particular a proof of work, has been executed correctly and that the nonce FRN of the further data block FTSB was calculated correctly.

The last step of the displayed embodiment is, in case of a positive verification, including INC-TSB the further data block FTSB into the distributed ledger LDG with the third computation unit CU.3.

If the further data block FTSB or the further timestamp transaction FIST contained in the further data block FTSB comprises a cryptocurrency transaction fee, by including INC-TSB the further data block FTSB into the distributed ledger LDG the transaction of the cryptocurrency is executed (at least in the local copy of the distributed ledger LDG stored within the block verification system BVS). Alternatively, if the execution of the transaction fee is to be documented in another distributed ledger LDG, the step of including INC-TSB the further data block FTSB into the distributed ledger LDG can comprise documenting the transfer of the cryptocurrency transaction fee in the another ledger.

TABLE D

| Pseudocode for inserting a further block | |
|---|---|
| D.1 | func insert_block(data_block): |
| D.2 | t_curr = time_server.time( ) |
| D.3 | if t_curr > data_block.timestamp.t_vrfy |
| D.4 | return |
| D.5 | counter = 0 |
| D.6 | for db in ledger.blocks: |
| D.7 | if TSB.timestamp.h_data<br>= data_block.timestamp.h_data |
| D.8 | counter += 1 |
| D.9 | if counter >= vrfy_number: |
| D.10 | return |
| D.11 | ledger.blocks.append(data_block) |

Table D displays pseudocode implementing an embodiment of the method for including INCL-TSB a further data block FTSB into a distributed ledger LDG.

In line D.1, the function "insert_block" is defined taking the further data block FTSB as parameter (variable "data_block").

In line D.2, the third time T.3 (variable "t_curr") is determined by querying an external time server, this third time T.3 is then used to verify the further verification time FVT in lines D.3 and D.4.

In lines D.5 to D.10, it is checked that the number of data blocks TSB.1, ..., TSB.3 in the distributed ledger LDG already containing the further timestamp transaction FIST is smaller than the number of data blocks TSB.1, ..., TSB.3 needed for verifying the further timestamp transaction FIST. This check is optional and can be left out by simply skipping this lines of code.

In line D.11, the further data block FTSB is included INCL-TSB into the distributed ledger LDG if all previous checks had been positive.

Figure 5:
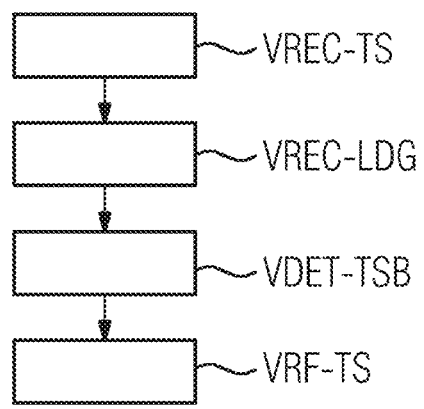

FIG. 5 displays an embodiment of a method for verifying a timestamp based on a distributed ledger LDG. In particular, this embodiment can be executed by a timestamp verification system, in particular, by a fourth interface of the timestamp verification system and a fourth computation unit of the timestamp verification system. Furthermore, the timestamp verification system can comprise a fourth memory unit.

The first step of the displayed embodiment is receiving VREC-TS a timestamp with a fourth interface, the timestamp comprising a hash of a dataset and a non-verified verification time.

In this embodiment, a timestamp comprising a hash of a dataset and a non-verified verification time is received VREC-TS by receiving a timestamp transaction TST.1, . . . , TST.3 comprising the hash of the dataset and the non-verified verification time. In particular, an pointer to an existing timestamp transaction TST.1, . . . , TST.3 and/or an existing data block TSB.1, . . . , TSB.3 can be received, and the distributed ledger LDG can be queried to determine the hash of the dataset and the non-verified verification time.

The second step of the displayed embodiment is receiving VREC-LDG a distributed ledger LDG with the fourth interface, wherein the distributed ledger LDG comprises data blocks TSB.1, . . . , TSB.3. This step can comprise all advantageous features and embodiments of the respective step displayed in FIG. 4.

A further step of the displayed embodiment is determining DET-TSB a set of data blocks TSB.1, . . . , TSB.3 contained in the distributed ledger LDG with a fourth computation unit, wherein each data block TSB.1, . . . , TSB.3 of the set of data blocks TSB.1, . . . , TSB.3 comprises a timestamp transaction TST.1, . . . , TST.3 comprising the hash of the dataset, wherein the timestamp transaction TST.1, . . . , TST.3 comprises a verification time VT.1, VT.2, VT.3 being earlier than or equal to the non-verified verification time.

In this embodiment, all data blocks TSB.1, . . . , TSB.3 of the distributed ledger LDG are iterated, and within each of the data blocks TSB.1, . . . , TSB.3, the timestamp transactions TST.1, . . . , TST.3 of the respective data block TSB.1, . . . , TSB.3 is iterated. So for each timestamp transaction TST.1 TST.3 it can be checked whether it comprises the hash of the dataset and the non-verified verification time.

The last step of the displayed embodiment is verifying VRF-TS the timestamp based on the set of data blocks TSB.1, . . . , TSB.3 with the fourth computation unit.

In this embodiment, if the number of data blocks TSB.1, . . . , TSB.3 with timestamp transactions TST.1, . . . , TST.3 comprising the hash H(DS.1), . . . , H(DS.3) of the dataset DS.1, . . . , DS.3 and a verification time earlier than or equal to the non-verified verification time is greater or equal a certain threshold, the method returns the Boolean value "true", in all other cases, the method returns the Boolean value "false".

It is also possible to verify the correctness of the distributed ledger LDG within this step, in particular, verifying that the consensus mechanism has been executed correctly for each data block TSB.1, . . . , TSB.3 of the distributed ledger LDG.

TABLE E

Pseudocode for verifying a timestamp

| E.1 | func verify_timestamp(timestamp): |
| E.2 | if !verify(ledger): |
| E.3 | return false |
| E.4 | counter = 0 |
| E.5 | for db in ledger.blocks: |

TABLE E-continued

Pseudocode for verifying a timestamp

| E.6 | if db.timestamp.h_data = timestamp.h_data |
| E.7 | counter += 1 |
| E.8 | if db.timestamp.t_vrfy > timestamp.t_vrfy |
| E.9 | return false |
| E.10 | if counter <= vrfy_number: |
| E.11 | return true |
| E.12 | else: |
| E.13 | return false |

Table E displays pseudocode implementing an embodiment of the method for verifying VRF-TS based on a distributed ledger LDG.

In line E.1, a timestamp is received REC-TS by being a parameter of the function "verify timestamp". In lines E.2 and E.3 it is checked that the distributed ledger LDG (variable "ledger") is correct, in particular, that for each data block TSB.1, . . . , TSB.3 the consensus mechanism has been executed correctly. If this is not the case, the timestamp received cannot be verified, and the function "verify timestamp" returns "false".

In lines E.4 to E.9, the set of data blocks TSB.1, . . . , TSB.3 of the distributed ledger LDG are checked to count the number of data blocks TSB.1, . . . , TSB.3 comprising a timestamp transaction TST.1, . . . , TST.3 comprising the hash H(DS.1), . . . , H(DS.3) of the dataset DS.1, DS.3 (variable "timestamp.h_data") and a verification time earlier than or equal to the non-verified verification time (variable "timestamp.t_vrfy"). In this embodiment, if the verification time VT.1, . . . , VT.3 of the timestamp transaction TST.1, . . . , TST.3 comprising the H(DS.3) of the dataset DS.1, . . . , DS.3 is later than the non-verified verification time, the function "verify timestamp" returns the Boolean value "false". Alternatively, such data blocks TSB.1, . . . , TSB.3 can instead not be considered for the "counter" variable.

In lines E.10 to E.13, the number of data blocks TSB.1, . . . , TSB.3 within the set of data blocks TSB.1, . . . , TSB.3 is determined, and the results is given based on a comparison of this number with a predefined threshold number (variable "vrfy_number").

FIG. 6 displays an embodiment of the method for creating and including a further data block FTSB into a distributed ledger LDG. In particular, this embodiment can be executed by a block system comprising a timestamp creation system TCS, a block creation system BCS and a block verification system BVS, each subsystem comprising an interface IF.1, IF.2, IF.3 and a computation unit CU.1, CU.2, CU.3.

The embodiment comprises the steps of receiving REC-HD a hash H(FDS) of a dataset FDS with a second interface IF.2, determining DET-CT2 a second time T.2 by querying a time server with a second computation unit CU.2, The next step of the displayed embodiment is receiving REC-LDG2 a distributed ledger LDG with the second interface IF.2, wherein the distributed ledger LDG comprises data blocks TSB.1, . . . , TSB.3, determining DET-BCT2 an average block creation time based on the distributed ledger LDG with the second computation unit CU.2, determining DET-VT a further verification time FVT based on the second time T.2 with the second computation unit CU.2, wherein the further verification time FVT is later than the second time T.2, determining DET-TST the further timestamp transaction FIST with the second computation unit CU.2, wherein the further timestamp transaction FIST comprises the hash H(FDS) of the dataset FDS and the further verification time FVT, and optionally the second time T.2, and providing PROV-TST the further timestamp transaction FIST with the second interface IF.2. These steps can comprise all advantageous features and embodiments described for the respective steps of FIG. 3.

The embodiment furthermore comprises the steps of is receiving REC-TST the further timestamp transaction FIST with the first interface IF.1, receiving REC-LDG1 a distributed ledger LDG with the first interface IF.1, determining DET-CT1 a first time T.1 by querying a time server with a first computation unit CU.1, determining DET-BCT1 an average block creation time based on the distributed ledger LDG with the first computation unit CU.1, wherein performing CHK-1 the first check is furthermore based on the average block creation time, performing CHK-1 a first check based on the first time T.1 and the further verification time FVT with the first computation unit CU.1, performing CHK-2 a second check based on the distributed ledger LDG and the further timestamp transaction FIST with the first computation unit CU.1, determining DET-TSB the further data block FTSB to be inserted into the distributed ledger LDG with the first computation unit CU.1, wherein the further data block FTSB comprises the further timestamp transaction FIST, and providing PROV-TSB the further data block FTSB with the first interface IF.1. These steps can comprise all advantageous features and embodiments described for the respective steps of FIG. 2.

The embodiment furthermore comprises the steps of receiving VREC-TSB the further data block FTSB with a third interface IF.3, receiving VREC-LDG the distributed ledger LDG with the third interface IF.3, determining VDET-CT3 a third time T.3 by querying a time server with a third computation unit CU.3, verifying VRF-TSB the further data block FTSB based on the third time T.3, and optionally based on the distributed ledger LDG, with the third computation unit CU.3, and in case of a positive verification, including INC-TSB the further data block FTSB into the distributed ledger LDG with the third computation unit CU.3. These steps can comprise all advantageous features and embodiments described for the respective steps of FIG. 4.

FIG. 7 displays a block creation system BCS, a transaction creation system TCS, and a block verification system BVS. The block creation system BCS comprises a first interface IF.1, a first computation unit CU.1, and a first memory unit MU.1. The transaction creation system TCS comprises a second interface IF.2, a second computation unit CU.2, and a second memory unit MU.2. The block verification system BVS comprises a third interface IF.3, a third computation system CU.3, and a third memory unit MU.3.

The block creation system BCS, the transaction creation system TCS and/or the block verification system BVS can be a (personal) computer, a workstation, a virtual machine running on host hardware, a microcontroller, or an integrated circuit. In particular, the block creation system BCS, the transaction creation system TCS and/or the block verification system BVS can be mobile devices, e.g. a smartphone or a tablet. As an alternative, block creation system BCS, the transaction creation system TCS and/or the block verification system BVS can be a real or a virtual group of computers (the technical term for a real group of computers is "cluster", the technical term for a virtual group of computers is "cloud").

The block creation system BCS and the transaction creation system TCS are connected by a first network, the block creation system BCS and the block verification system BVS are connected by a second network. It is also possible that the block verification system BVS and the transaction creation system TCS can be connected by a third network. The first network NW.1, the second network NW.2 and/or the third network can be identical; alternatively, the first network NW.1, the second network NW.2 and/or the third network can be different networks.

An interface IF.1, IF.2, IF.3 can be embodied as a hardware interface or as a software interface (e.g. PCIBus, USB or Firewire). In general, a computation unit CU.1, CU.2, CU.3 can comprise hardware elements and software elements, for example a microprocessor, a CPU (acronym for "central processing unit"), a GPU (acronym for "graphical processing unit"), a field programmable gate array (an acronym is "FPGA") or an ASIC. (acronym for "application-specific integrated circuit"). The calculation unit CU.1, CU.2, CU.3 can be configured for multithreading, i.e. the calculation unit CU.1, CU.2, CU.3 can host different calculation processes at the same time, executing the either in parallel or switching between active and passive calculation processes. A memory unit MU.1, MU.2, MU.3 can be e.g. non-permanent main memory (e.g. random access memory) or permanent mass storage (e.g. hard disk, USB stick, SD card, solid state disk).

The first network NW.1, the second network NW.2 and/or the third network can be realized as a LAN (acronym for "local area network"), in particular a WiFi network, or any other local connection, e.g. via Bluetooth or USB (acronym for "universal serial bus"). A network NW.1, NW.2 can alternatively also be realized as a VPN (acronym for "virtual private network").

FIG. 8 displays the timeline of the different methods related to the invention. A first processing step P1 corresponds to the method of determining a further timestamp transaction FIST, the second processing step P2 corresponds to the method of determining a further data block FTSB, the third processing step P3 corresponds to the method of validating the further data block FTSB.

Furthermore, the second processing step P2 comprises a first substep P2.1 corresponding to a preprocessing, a second substep P2.2 corresponding to executing a consensus mechanism, and a third substep P2.3 corresponding to a postprocessing.

In a first embodiment, the first time T.1 corresponds to a time of the preprocessing P2.1 (in other words, the first time T.1 is determined by querying a time server before executing the consensus mechanism), the second time T.2 corresponds to a time of the first processing step P1, and the third time T.3 corresponds to a time of the third processing step P3. In particular, also the second time T.2 and the third time T.3 are determined by querying a time server during the respective processing step. The further verification time FVT is after the third processing step.

In a second embodiment, the first time T.1 corresponds to a time of the postprocessing P2.2 (in other words, the first time T.1 is determined by querying a time server after executing the consensus mechanism), the second time T.2 corresponds to a time of the first processing step P1, and the third time T.3 corresponds to a time of the third processing step P3. In particular, also the second time T.2 and the third time T.3 are determined by querying a time server during the respective processing step. The further verification time FVT is after the third processing step.

Both in the first and the second embodiment, the block time FCT of the further data block FTSB can correspond to the first time T.1 or to the second time T.2.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

The invention claimed is:

1. A method for determining a further data block, the method comprising:
received a further timestamp transaction via a first interface, the further timestamp transaction including a hash of a dataset and a further verification time;
receiving a distributed ledger via the first interface, the distributed ledger including data blocks;
determining, via a first computation unit, a first time by querying a time server;
performing, via the first computation unit, a first check based on the first time and the further verification time to verify that the further data block can be created; and
determining, via the first computation unit, the further data block based on the distributed ledger in response to the first check verifying that the further data block can be created, the further data block including the further timestamp transaction.

2. The method of claim 1, wherein the first check verifies that the further data block can be created upon the further verification time being later than the first time.

3. The method of claim 2, further comprising:
determining, via the first computation unit, an average block creation time based on the distributed ledger, wherein the first check is based on the average block creation time.

4. The method of claim 2, further comprising:
performing, via the first computation unit, a second check based on the distributed ledger and the further timestamp transaction, wherein the determining of the further data block based on the distributed ledger is in response to the first check verifying that the further data block can be created and the second check being positive.

5. The method of claim 4, wherein the second check is positive upon a number of data blocks contained in the distributed ledger related to the further timestamp transaction being lower than a threshold number.

6. The method of claim 1, further comprising:
determining, via the first computation unit, an average block creation time based on the distributed ledger, wherein the first check is based on the average block creation time.

7. The method of claim 1, further comprising:
performing, via the first computation unit, a second check based on the distributed ledger and the further timestamp transaction, wherein the determining of the further data block based on the distributed ledger is in response to the first check verifying that the further data block can be created and the second check being positive.

8. The method of claim 7, wherein the second check is positive upon a number of data blocks contained in the distributed ledger related to the further timestamp transaction being lower than a threshold number.

9. The method of claim 1, wherein at least one of
the data blocks include a first data block and at least one second data block, the first data block being linked to the at least one second data block, and the at least one second data block preceding the first data block in the distributed ledger,
the distributed ledger is at least one of a blockchain, a blocktree, or a tangle, or
the determining of the further data block based on the distributed ledger includes at least one of executing a proof-of-work, a proof-of-stake, or a proof-of-elapsed-time.

10. A non-transitory computer program product storing program elements, loadable into a memory of a block creation system, to cause the block creation system to carry out the method of claim 1, when the program elements are executed by the block creation system.

11. A non-transitory computer-readable medium storing program elements, readable and executable by a block creation system, to perform the method of claim 1, when the program elements are executed by the block creation system.

12. A method for providing a further timestamp transaction, comprising:
receiving a hash of a dataset via an interface;
determining, via a computation unit, a time by querying a time server;
determining, via the computation unit, a further verification time based on the time, the further verification time being determined such that the further timestamp transaction can be inserted into a number of data blocks of a distributed ledger and the number of data blocks can be created before a current time is later in time than the further verification time, and the further verification time being later than the time;
determining the further timestamp transaction via the computation unit, the further timestamp transaction including at least the hash of the dataset and the further verification time; and
providing the further timestamp transaction via the interface.

13. The method of claim 12, further comprising:
receiving a distributed ledger via the interface, the distributed ledger including data blocks; and
determining, via the computation unit, an average block creation time based on the distributed ledger, the further verification time being based on the average block creation time.

14. The method of claim 13, further comprising:
determining the hash of the dataset by
receiving an unencrypted dataset via the interface,
determining, via the computation unit, the dataset by symmetrically encrypting the unencrypted dataset based on a key,
transferring, via the computation unit, the dataset to an external storage service,
storing the key of the symmetrically encrypted dataset within a memory unit, and
determining the hash of the dataset via the computation unit.

15. The method of claim 12, further comprising:
determining the hash of the dataset by
receiving an unencrypted dataset via the interface,
determining, via the computation unit, the dataset by symmetrically encrypting the unencrypted dataset based on a key,
transferring, via the computation unit, the dataset to an external storage service,
storing the key of the symmetrically encrypted dataset within a memory unit, and
determining the hash of the dataset via the computation unit.

16. The method of claim 15, wherein
the key includes a first set of partial keys,
the unencrypted dataset is determinable based on the dataset and a second set of partial keys, and
the second set of partial keys is a subset of the first set of partial keys.

17. A non-transitory computer program product storing program elements, loadable into a memory of a transaction creation system, to cause the transaction creation system to carry out the method of claim 12, when the program elements are executed by the transaction creation system.

18. A non-transitory computer-readable medium storing program elements, readable and executable by a transaction creation system, to perform the method of claim 12, when the program elements are executed by the transaction creation system.

19. A method for including a further data block into a distributed ledger, the method comprising:
receiving the further data block via an interface, the further data block including a further timestamp transaction;
receiving the distributed ledger via the interface;
determining, via a computation unit, a time by querying a time server;
verifying, via the computation unit, the further data block based on at least the time and a further verification time to verify that the further data block can be included in the distributed ledger; and
including, via the computation unit, the further data block into the distributed ledger in response to the verifying of the further data block indicating that the further data block can be included in the distributed ledger.

20. A non-transitory computer program product storing program elements, loadable into a memory of a block verification system, to cause the block verification system to execute the method of claim 19, when the program elements are executed by the block verification system.

21. A non-transitory computer-readable medium storing program elements, readable and executable by a block verification system, to perform the method of claim 19, when the program elements are executed by the block verification system.

22. A block creation system for determining a further data block, the block creation system comprising:
a first interface, the first interface being configured to
receive a further timestamp transaction, the further timestamp transaction including a hash of a dataset and a further verification time, and
receive a distributed ledger, the distributed ledger including data blocks; and
a first computation unit, the first computation unit being configured to
determine a first time by querying a time server,
perform a first check based on the first time and the further verification time to verify that the further data block can be created, and
determine the further data block based on the distributed ledger in response to the first check indicating that the further data block can be created, the further data block including the further timestamp transaction.

23. A transaction creation system for providing a further timestamp transaction, the transaction creation system comprising:
an interface, the interface configured to
receive a hash of a dataset, and
provide the further timestamp transaction; and
a computation unit, the computation unit configured to
determine a time by querying a time server,
determine a further verification time based on the time, the further verification time being determined such that the further timestamp transaction can be inserted into a number of data blocks of a distributed ledger and the number of data blocks can be created before a current time is later in time than the further verification time, and the further verification time being later than the time, and
determine the further timestamp transaction, the further timestamp transaction including at least the hash of the dataset and the further verification time.

* * * * *